US011039121B2

United States Patent
Myokan et al.

(10) Patent No.: US 11,039,121 B2
(45) Date of Patent: Jun. 15, 2021

(54) CALIBRATION APPARATUS, CHART FOR CALIBRATION, CHART PATTERN GENERATION APPARATUS, AND CALIBRATION METHOD

(71) Applicant: Sony Interactive Entertainment Inc., Tokyo (JP)

(72) Inventors: Yoshihiro Myokan, Kanagawa (JP); Tetsugo Inada, Tokyo (JP); Junichi Muramoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/615,280

(22) PCT Filed: Jun. 20, 2017

(86) PCT No.: PCT/JP2017/022692
§ 371 (c)(1),
(2) Date: Nov. 20, 2019

(87) PCT Pub. No.: WO2018/235163
PCT Pub. Date: Dec. 27, 2018

(65) Prior Publication Data
US 2020/0177866 A1 Jun. 4, 2020

(51) Int. Cl.
*H04N 13/246* (2018.01)
*G06T 7/80* (2017.01)

(52) U.S. Cl.
CPC ............ *H04N 13/246* (2018.05); *G06T 7/85* (2017.01)

(58) Field of Classification Search
None
See application file for complete search history.

(56) References Cited

U.S. PATENT DOCUMENTS 7,196,721 B2 * 3/2007 Uchiyama ................. G06T 7/80
                                                    348/187
7,894,661 B2   2/2011 Kosaka
(Continued)

FOREIGN PATENT DOCUMENTS

CN          106548477 A     3/2017
EP            0999518 A1    5/2000
(Continued)

OTHER PUBLICATIONS

Zonghua Zhang, Haiyan Ma, Tong Guo, Sixiang Zhang, and Jinping Chen, "Simple, flexible calibration of phase calculation-based three-dimensional imaging system," Opt. Lett. 36, 1257-1259 (Year: 2011).*

(Continued)

*Primary Examiner* — Jayanti K Patel
*Assistant Examiner* — Stefan Gadomski
(74) *Attorney, Agent, or Firm* — Matthew B. Dernier, Esq.

(57) ABSTRACT

Provided is a calibration apparatus that performs calibration by using a captured image of a chart including a plurality of plane surfaces forming a predetermined angle θ. An imaging apparatus simultaneously images chart patterns depicted on each of the plane surfaces of the chart. In this instance, the chart pattern depicted on each of the plane surfaces of the chart is inversely projected in accordance with a distance from an imaging plane such that patterns in which feature points are uniformly distributed within the captured image are obtained.

12 Claims, 19 Drawing Sheets

(56) References Cited

U.S. PATENT DOCUMENTS

| | | | |
|---|---|---|---|
| 7,983,476 B2* | 7/2011 | Tate | G06T 7/73 382/154 |
| 8,106,968 B1* | 1/2012 | Rudin | G06T 7/60 348/241 |
| 8,872,897 B2* | 10/2014 | Grossmann | G06T 7/80 348/46 |
| 9,996,931 B2* | 6/2018 | Yamamoto | G06T 7/60 |
| 10,127,687 B2* | 11/2018 | Matsuzawa | H04N 5/232 |
| 10,140,687 B1* | 11/2018 | Engel | H04N 5/2628 |
| 10,142,544 B1* | 11/2018 | Engel | H04N 5/23238 |
| 10,699,440 B2* | 6/2020 | Matsuzawa | G06T 7/60 |
| 2004/0170315 A1 | 9/2004 | Kosaka | |
| 2004/0189674 A1* | 9/2004 | Zhang | H04N 1/19594 345/629 |
| 2006/0221417 A1* | 10/2006 | Fujieda | G06T 7/12 358/538 |
| 2006/0232569 A1* | 10/2006 | Lin | G06F 3/03545 345/179 |
| 2006/0291719 A1 | 12/2006 | Fujieda | |
| 2007/0024712 A1* | 2/2007 | Morita | H04N 17/002 348/187 |
| 2008/0031514 A1* | 2/2008 | Kakinami | G06T 7/80 382/154 |
| 2008/0228434 A1* | 9/2008 | Aratani | G06T 7/70 702/150 |
| 2008/0240616 A1* | 10/2008 | Haering | G06T 7/80 382/294 |
| 2009/0161945 A1* | 6/2009 | Morgan-Mar | G06K 9/3216 382/154 |
| 2010/0194886 A1* | 8/2010 | Asari | G06T 7/85 348/148 |
| 2010/0232684 A1* | 9/2010 | Fujieda | G06T 7/85 382/154 |
| 2010/0295948 A1* | 11/2010 | Xie | G06T 7/80 348/175 |
| 2011/0129154 A1* | 6/2011 | Shimodaira | G06T 7/80 382/190 |
| 2011/0199491 A1* | 8/2011 | Jikihira | H04N 17/002 348/188 |
| 2012/0002057 A1* | 1/2012 | Kakinami | G06T 7/85 348/187 |
| 2012/0262607 A1* | 10/2012 | Shimura | G06T 7/593 348/239 |
| 2013/0044186 A1* | 2/2013 | Jin | G06T 7/174 348/46 |
| 2013/0058526 A1 | 3/2013 | Kang | |
| 2013/0195351 A1* | 8/2013 | Hamada | G06T 11/00 382/159 |
| 2014/0168367 A1* | 6/2014 | Kang | G06T 7/85 348/46 |
| 2014/0300704 A1* | 10/2014 | Ramaswamy | G06T 7/85 348/48 |
| 2015/0029465 A1* | 1/2015 | Ishikawa | G09G 5/00 353/30 |
| 2015/0062381 A1* | 3/2015 | Na | G06T 11/60 348/239 |
| 2015/0124055 A1* | 5/2015 | Kotake | G01B 11/2513 348/46 |
| 2015/0227798 A1* | 8/2015 | Nagano | G06K 9/2063 382/103 |
| 2015/0288951 A1* | 10/2015 | Mallet | H04N 17/002 348/46 |
| 2015/0369593 A1* | 12/2015 | Myllykoski | G06T 7/62 348/136 |
| 2016/0225137 A1* | 8/2016 | Horovitz | G06T 7/70 |
| 2016/0292831 A1* | 10/2016 | Bogan | G06T 5/006 |
| 2016/0292950 A1* | 10/2016 | Czyzewski | G06K 9/3216 |
| 2016/0343136 A1* | 11/2016 | Heidi | G06T 7/80 |
| 2016/0371889 A1* | 12/2016 | Kim | H04N 17/002 |
| 2017/0287145 A1* | 10/2017 | Cho | G06T 7/20 |
| 2017/0339395 A1* | 11/2017 | Hall | H04N 13/239 |
| 2017/0339400 A1* | 11/2017 | Hall | H04N 5/247 |
| 2018/0061021 A1* | 3/2018 | Lin | G06T 7/80 |
| 2018/0071032 A1* | 3/2018 | de Almeida Barreto | G06T 7/62 |
| 2018/0225536 A1* | 8/2018 | Tonouchi | G06K 9/3233 |
| 2019/0121217 A1* | 4/2019 | Ikeda | H04N 7/18 |
| 2019/0132560 A1* | 5/2019 | Grosse | H04N 17/002 |
| 2019/0147609 A1* | 5/2019 | Lohry | G06K 9/00201 382/154 |
| 2019/0234746 A1* | 8/2019 | Zhang | G01C 21/16 |
| 2019/0356861 A1* | 11/2019 | Li | H04N 1/3873 |

FOREIGN PATENT DOCUMENTS

| | | |
|---|---|---|
| EP | 1434169 A2 | 6/2004 |
| JP | 2004213332 A | 7/2004 |
| JP | 2004341616 A | 12/2004 |
| JP | 2007026423 A | 2/2007 |
| JP | 2014230215 A | 12/2014 |

OTHER PUBLICATIONS

International Preliminary Report on Patentability and Written Opinion for corresponding PCT Application No. PCT/JP2017/022692, 16 pages, dated Dec. 9, 2017.

International Search Report for corresponding PCT Application No. PCT/JP2017/022692, 4 pages, dated Sep. 12, 2017.

Zhengyou Zhang, "A Flexible New Technique for Camera Calibration" Technical Report MSR-TR-98-71, Microsoft Research, Microsoft Corporation, 22 pages, (Dec. 2, 1998).

Zhang, "A Flexible new technique for camera calibration" IEEE Transactions on Pattern Analysis and Machine Intelligence, vol. 22, No. 11, pp. 1330-1334, Nov. 1, 2000.

Partial European Search Report for corresponding EP Application No. EP 17914805.1, 15 pages, dated Dec. 8, 2020 (previously cited in IDS dated Jan. 11, 2021).

Supplementary European Search Report for corresponding EP Application No. EP 17914805.0, 19 pages, dated Mar. 31, 2021.

* cited by examiner

FIG. 16

| CAMERA ID 82 | PLANE SURFACE ID 84 | INDEX 86 | 2D POSITION COORDINATES 88 | 3D POSITION COORDINATES 90 |
|---|---|---|---|---|
| 0 | 0 | $(-m, -m)$ | $(u_0, v_0)$ | $(x''_0, y''_0, z''_0)$ |
|   |   | $(-m+1, -m)$ | $(u_1, v_1)$ | $(x''_1, y''_1, z''_1)$ |
|   |   | ... | ... | ... |
|   |   | $(n, n)$ | $(u_N, v_N)$ | $(x''_N, y''_N, z''_N)$ |
|   | 1 | $(-m, -m)$ | $(u_0, v_0)$ | $(x''_0, y''_0, z''_0)$ |
|   |   | $(-m+1, -m)$ | $(u_1, v_1)$ | $(x''_1, y''_1, z''_1)$ |
|   |   | ... | ... | ... |
|   |   | $(n, n)$ | $(u_N, v_N)$ | $(x''_N, y''_N, z''_N)$ |
| 1 | 0 | $(-m, -m)$ | $(u_0, v_0)$ | $(x''_0, y''_0, z''_0)$ |
|   |   | $(-m+1, -m)$ | $(u_1, v_1)$ | $(x''_1, y''_1, z''_1)$ |
|   |   | ... | ... | ... |
|   |   | $(n, n)$ | $(u_N, v_N)$ | $(x''_N, y''_N, z''_N)$ |
|   | 1 | $(-m, -m)$ | $(u_0, v_0)$ | $(x''_0, y''_0, z''_0)$ |
|   |   | $(-m+1, -m)$ | $(u_1, v_1)$ | $(x''_1, y''_1, z''_1)$ |
|   |   | ... | ... | ... |
|   |   | $(n, n)$ | $(u_N, v_N)$ | $(x''_N, y''_N, z''_N)$ |
| ... | ... | ... | ... | ... |

80

CALIBRATION APPARATUS, CHART FOR CALIBRATION, CHART PATTERN GENERATION APPARATUS, AND CALIBRATION METHOD

TECHNICAL FIELD

The present invention relates to an apparatus for calibrating an imaging apparatus, a chart used for calibration, and a calibration method.

BACKGROUND ART

There is a known game in which an image of a user's body and an image of a marker are captured by a camera and each region of the captured images is replaced by a different image to display the different image on a display (refer, for example, to PTL 1). A technology of acquiring a position and a motion of an object and a camera or recognizing attributes of the object by detecting and analyzing the image in the captured image is widely introduced into not only a camera mounted on a gaming apparatus or an information terminal, but also a system including, for example, a security camera, a vehicle-mounted camera, and a robot-mounted camera.

In order to ensure processing accuracy in such a system, a calibration is performed to acquire, in advance, apparatus-specific information such as an internal parameter, a distortion correction coefficient, and an external parameter of an imaging apparatus. The internal parameter defines a relation between position coordinates of pixels in a captured image and position coordinates in a camera coordinate system having an origin at an optical center and based on the unit of length, and represents lens characteristics determined by a focal length, a relative origin position, a shear factor, and a scale factor.

The distortion correction coefficient is a coefficient for correcting lens-induced barrel distortion or circumferential distortion. The external parameter is used, for example, to define a relation between a camera coordinate system and a world coordinate system and perform simultaneous calibration of a multi-eye camera such as a stereo camera, in particular, for the purpose, for example, of adjusting inclinations of individually-captured images. A method by Zhang is widely known as a calibration technology (refer to NPL 1). The method by Zhang captures an image of a plane chart of a checkered pattern from multiple viewpoints, and optimizes parameters so as to establish a correct association between positions of feature points in the captured image and positions of feature points on the plane surface of the chart in a real space.

CITATION LIST

Patent Literature

[PTL 1] European Patent Application Publication No. 0999518

Non Patent Literature

[NPL 1] Zhengyou Zhang, "A Flexible New Technique for Camera Calibration," Microsoft Research Technical Report, MSR-TR-98-71, Dec. 2, 1998.

SUMMARY

Technical Problems

When the method by Zhang is used, it is necessary to set an imaging apparatus and a chart at different positions and postures, and repeatedly capture an image. This imposes a heavy workload. Imaging workload may be reduced under certain restraint conditions. However, it is conceivable that versatility may be lost by such restraint conditions. Meanwhile, a simple calibration method is not likely to achieve accuracy comparable to that of the method by Zhang.

The present invention has been made in view of the above circumstances, and has an object to provide a technology capable of calibrating an imaging apparatus through reduced man-hours with high accuracy.

Solution to Problems

In order to solve the above problem, one aspect of the present invention relates to a calibration apparatus. The calibration apparatus includes an image acquisition section acquiring data regarding a captured image of a chart having a plurality of plane surfaces forming a predetermined angle, a feature point information acquisition section detecting, from the captured image, an image of a feature point of a chart pattern depicted on a surface of the chart, and generating feature point information indicative of association between position coordinates of the image of the feature point and position coordinates of the feature point on the surface of the chart, and a calibration section performing computation for calibration on a basis of the feature point information, and acquiring a predetermined camera parameter to be output, in which the feature point information acquisition section identifies, within the captured image, an image of each of the plane surfaces on a basis of an image of a marker included in the chart pattern, and performing a process of generating the feature point information for each of the plane surfaces.

Another aspect of the present invention relates to a chart for calibration. The chart for calibration is for calibrating an imaging apparatus. The chart for calibration includes a plurality of plane surfaces forming a predetermined angle, and a chart image that is depicted on each of the plane surfaces and obtained by transforming a predetermined pattern in accordance with a change in distance between an imaging plane and each of the plane surfaces in such a manner as to acquire the predetermined pattern within a captured image.

Yet another aspect of the present invention relates to a chart pattern generation apparatus. The chart pattern generation apparatus generates a chart pattern that is to be depicted on a chart for calibration of an imaging apparatus. The chart pattern generation apparatus includes an inverse transformation parameter generation section acquiring setting information regarding positions and postures of a plurality of plane surfaces forming the chart and an imaging plane of the imaging apparatus, and generating a transformation parameter for achieving transformation based on a change in distance between the imaging plane and each of the plane surfaces in such a manner as to obtain a predetermined pattern within a captured image, and a pattern transformation section transforming the predetermined pattern by using the transformation parameter and generating data regarding the chart pattern to be output.

Still another aspect of the present invention relates to a calibration method. The calibration method includes a step of acquiring, from an imaging apparatus, data regarding a captured image of a chart having a plurality of plane surfaces forming a predetermined angle, a step of detecting, from the captured image, an image of a feature point of a chart pattern depicted on a surface of the chart and generating feature point information indicative of association between position coordinates of the image of the feature point and position coordinates of the feature point on the surface of the chart, and a step of performing computation for calibration on a basis of the feature point information and acquiring a predetermined camera parameter to be output, in which the step of generating the feature point information identifies, within the captured image, an image of each of the plane surfaces on a basis of an image of a marker included in the chart pattern and performing a process of generating the feature point information for each of the plane surfaces.

Any combinations of the aforementioned elements and any conversions of expressions of the present invention between, for example, methods, apparatuses, systems, recording media, and computer programs are also effective as aspects of the present invention.

Advantageous Effect of Invention

The present invention makes it possible to calibrate an imaging apparatus through reduced man-hours with high accuracy.

BRIEF DESCRIPTION OF DRAWINGS

FIG. 16 is a diagram illustrating an exemplary data structure of feature point information stored in a feature point information storage section in the embodiment of the present invention.

DESCRIPTION OF EMBODIMENT

Figure 1:
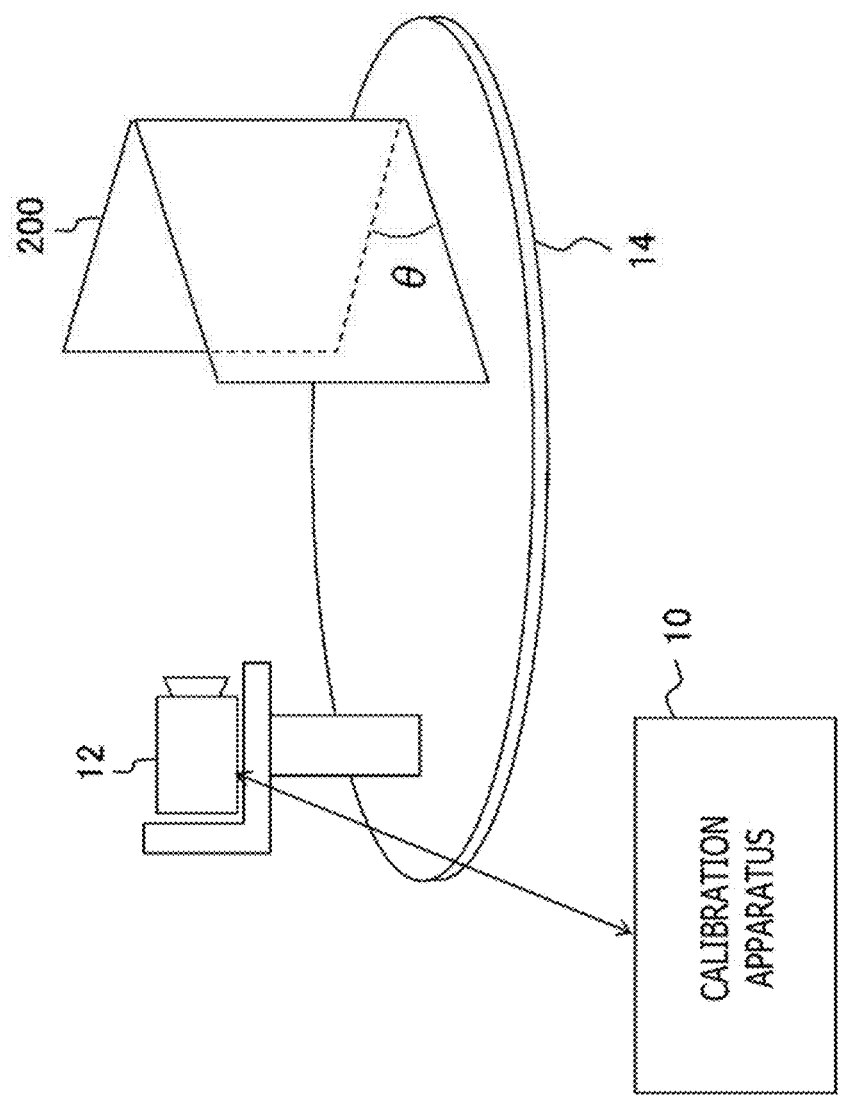
FIG. 1 is a diagram illustrating a configuration of a calibration system according to an embodiment of the present invention.

FIG. 1 illustrates a configuration of a calibration system according to an embodiment of the present invention. The calibration system includes an imaging apparatus 12, a chart 200 for calibration, a jig 14, and a calibration apparatus 10. The imaging apparatus 12 performs calibration. The jig 14 fixes the imaging apparatus 12 and the chart 200 in a predetermined positional relation. The calibration apparatus 10 performs calibration to acquire a camera parameter.

The imaging apparatus 12 includes a camera and a mechanism. The camera captures an image of an object. The mechanism generates output data regarding the captured image by performing a demosaicing process or other common process on an output signal from the camera, and transmits the generated output data to the calibration apparatus 10. The camera includes an infrared sensor or a visible-light sensor used with a common digital camera or digital video camera such as a charge-coupled device (CCD) sensor or a complementary metal oxide semiconductor (CMOS) sensor. In a case where the camera includes an infrared sensor, an infrared radiation mechanism (not depicted) may be added.

The imaging apparatus 12 may include only one camera or include a stereo camera that is configured by spacing two cameras (left and right cameras) apart at a known interval. As another alternative, the imaging apparatus 12 may include three or more cameras. The camera configuration for the imaging apparatus 12 is determined in accordance with details of information processing performed by using the imaging apparatus 12. For example, in a case where an electronic game is to be implemented acquiring positions of objects, such as a user and a controller, in a three-dimensional space, it is conceivable that the imaging apparatus 12 is implemented by using a stereo camera.

Further, in a case where the time-of-flight (TOF) technology is to be adopted to apply infrared rays toward an object and determine a position of the object in accordance with a time required for detecting light reflected from the object, it is conceivable that the imaging apparatus 12 is implemented by an infrared radiation mechanism and an infrared camera. It is also conceivable that the same configuration is adopted to apply infrared rays toward an object in a random pattern, capture an image of light reflected from the object with a stereo camera, determine a parallax by regarding an infrared pattern as a feature point, and determine the position of the object in a three-dimensional space. As still another alternative, a single-eye camera, a multi-eye camera, a visible-light camera, and an infrared camera may be used in any combination depending on the purpose of use and the technology to be adopted.

The calibration apparatus 10 acquires data regarding an image of the chart 200 for calibration that is captured by the imaging apparatus 12, and performs calibration computation based on the acquired data in order to derive an internal parameter and an external parameter. These parameters are commonly known. When these parameters are used, the relation between a pixel m(u, v) in the captured image and a position M(X, Y, Z) in a world coordinate system is expressed as indicated below.

$$s\tilde{m} = A[R|t]\tilde{M}$$

$$\tilde{m} = [u, v, 1]^T$$

$$\tilde{M} = [X, Y, Z, 1]^T \qquad \text{[Math. 1]}$$

In an equation above, s is a scale factor, and A is the internal parameter. [R|t] is the external parameter including a rotation matrix R and a translation vector t that are used for transforming the world coordinate system into a camera coordinate system. The internal parameter A is expressed as indicated below.

$$A = \begin{bmatrix} fk_u & 0 & u_0 \\ 0 & fk_v & v_0 \\ 0 & 0 & 1 \end{bmatrix} \qquad \text{[Math. 2]}$$

In an equation above, f is a focal length, $k_u$ and $k_v$ are horizontal and vertical scale factors of an image plane, and $(u_0, v_0)$ are position coordinates of an optical axis of the image plane. The above equation assumes that skew distortion is zero.

Further, when lens-induced barrel distortion or circumferential distortion is taken into consideration, a point at position coordinates (x, y) relative to the optical axis in the captured image is corrected, for example, to a point at position coordinates (x', y') by approximate equations below.

$$x' = (1 + k_1 r^2 + k_2 r^4)x + 2p_1 xy + p_2(r^2 + 2x^2)$$

$$y' = (1 + k_1 r^2 + k_2 r^4)y + p_1(r^2 + 2y^2) + 2p_2 xy$$

where $r^2 = x^2 + y^2$

Further, k1 and k2 are parameters related to barrel distortion, and p1 and p2 are parameters related to circumferential distortion. These parameters are collectively referred to as a distortion correction coefficient.

The calibration apparatus 10 determines the internal parameter, the distortion correction coefficient, and the external parameter in such a manner that an image of a feature point within the captured image appears at a position reflective of an original position in the three-dimensional space. These parameters may be hereinafter collectively referred to as a "camera parameter." A basic algorithm for camera parameter derivation processing may be based on an existing technology. Particularly, the method by Zhang described in NPL 1 may be used. More specifically, an image of a feature point depicted on the chart 200 is extracted from the captured image to determine its position coordinates. An initial value of the internal parameter is then determined based on the determined position coordinates and the three-dimensional position of the feature point, and a nonlinear optimization process called bundle adjustment is performed to finally determine the internal parameter and the external parameter.

Meanwhile, the chart 200 for calibration according to the present embodiment has a three-dimensional structure that includes a plurality of plane surfaces not parallel to an imaging plane. In the illustrated example, the chart 200 is in an upright state such that one side of one of two boards having the same area is attached to one side of the other board at an angle of θ (0<θ<180°) around an axis formed by these attached sides. The jig 14 fixes the two boards such that the optical axis of the imaging apparatus 12 intersects the axis of the chart 200 and is positioned and postured at a predetermined distance from the chart 200.

A chart pattern is depicted on each plane surface of the chart 200 that is positioned toward the imaging apparatus 12. The chart pattern includes a checkered pattern formed of alternating black and white rectangles arranged in a grid pattern and a marker for plane surface identification. In this case, the feature point is a vertex of each rectangle. When feature points are disposed with variations applied in the depth direction in the above-described manner, a single capture of an image makes it possible to acquire information that is equivalent to information obtained by capturing an image of one plane chart with the point of view varied. The pattern to be depicted on the chart 200 is not limited to a checkered pattern. Any pattern may be depicted on the chart 200 as far as distributed feature points are shaped and arranged in such a manner as to permit easy detection by an existing search method. For example, adopting a feature point array forming an orthogonal system, such as a circle grid formed by arranging black circles vertically and horizontally, makes it easy to detect feature points and acquire their attributes.

Figure 2:
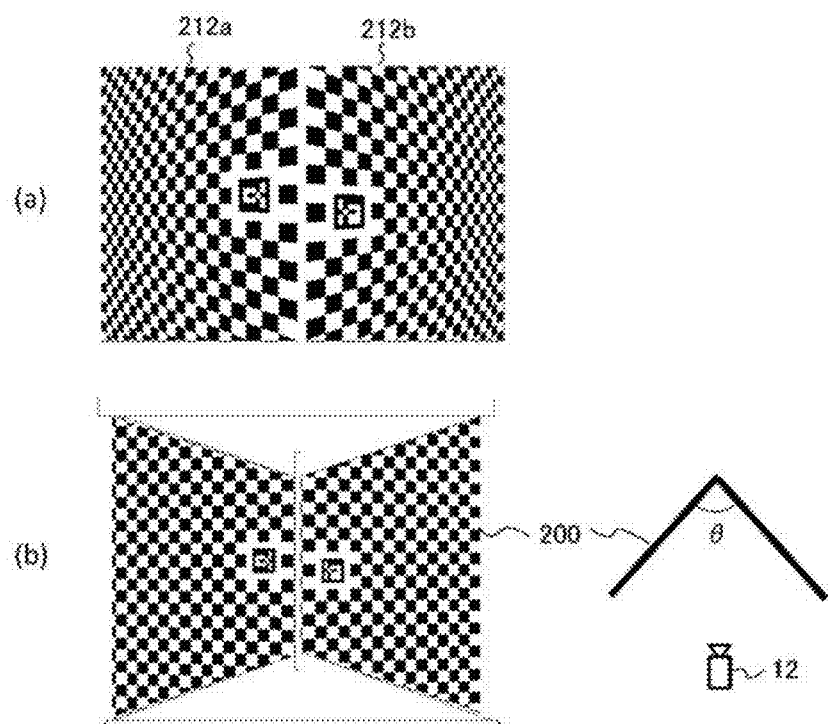
FIG. 2 is a diagram illustrating in detail a chart for calibration according to the embodiment of the present invention.

FIG. 2 is a diagram illustrating in more detail the chart 200 for calibration. Illustrated in (a) of FIG. 2 are chart patterns including a checker and a marker that are depicted on each plane surface forming the chart 200. A chart pattern 212a is depicted on the plane surface disposed on the left as viewed from the imaging apparatus 12. A chart pattern 212b is depicted on the plane surface disposed on the right. Illustrated in (b) of FIG. 2 is the chart 200 that is viewed from the imaging apparatus 12 when the two boards disposed at an angle of θ face the imaging apparatus 12 as indicated in a bird's-eye view depicted to the left of (b) of FIG. 2.

In the present embodiment, the chart patterns are configured so as to apparently look like common checkered patterns while the plane surfaces of the chart are inclined from the imaging plane. Also in the case of the other chart patterns, standard chart patterns determined in consideration, for example, of a search process is configured so as to appear in a captured image in a state in which the plane surfaces of the chart 200 are inclined. Therefore, as illustrated in (a) of FIG. 2, the chart patterns 212a and 212b depicted on the plane surfaces are in reverse perspective in consideration of inclination with respect to original checkered patterns.

Qualitatively, patterns on the surfaces of the chart 200 that are positioned far from the imaging plane are on a relatively large scale. Consequently, a captured image of graphical figures positioned at different distances in a real space indicates that graphical figures having the same horizontal and vertical dimensions are lined up evenly. As a result, information required for calibration can be obtained by performing a single imaging operation. In addition, it is possible to prevent a feature point detection process from becoming complicated. The present embodiment makes it possible to obtain a large amount of information by performing a single imaging operation. However, the present embodiment does not limit the number of imaging operations to one. A plurality of imaging operations may be performed as needed.

Figure 3:
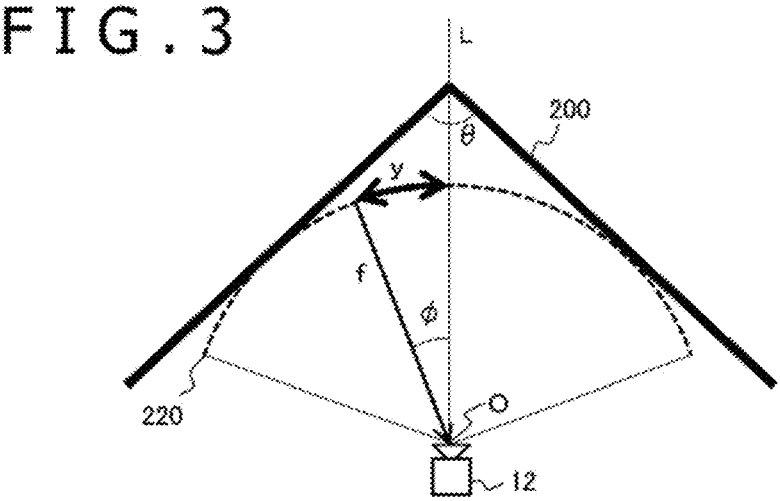
FIG. 3 is a diagram illustrating a preferred positional relation between an imaging apparatus and a chart in the embodiment of the present invention.

FIG. 3 is a diagram illustrating a preferred positional relation between the imaging apparatus 12 and the chart 200. When, for example, an image is captured with a fisheye lens by the equidistant projection method, a virtual screen 220 may be regarded as a spherical surface that has its origin at an optical center O of the imaging apparatus 12 and a radius equal to a focal length f. In this instance, there is the following relation between an angle φ and an image height. The angle φ is an angle formed between an optical axis L and a projection line from the real space to the lens. The image height is a distance from a projection point to a point of intersection between the virtual screen and the optical axis.

$$y = f \cdot \phi$$

As y=f·tan φ represents the central projection method using a common lens, it is obvious that, in a fisheye lens system, the degree of image contraction increases with an increase in the angle φ. Therefore, the chart 200 is disposed in contact with the virtual screen 220 as illustrated in FIG. 3 so as to image the chart patterns by covering the field-of-view range in which the influence of distortion is significant. Further, the degree of image contraction tends to increase from the center of the field of view toward the outside. Therefore, uniform analysis accuracy can be achieved in plane when the outer plane surfaces of the chart 200 are positioned closer to the imaging plane. Using an image captured in the above manner to derive the camera parameter makes it possible to accurately extract an image and measure its position while reducing an influence of lens distortion during an operation.

In the estimation of the focal length f, it is important to determine an extent by which a perspective projected image of an object is expanded or contracted in a depth direction. For example, a technology for determining the focal length f from the position of a vanishing point of a grid pattern disposes grid pattern plane surfaces at an appropriate angle from the imaging plane such that the vanishing point appears at a position close to an image center (refer, for example, to Kenichi Kanetani, "Mathematical Principles of Camera Calibration—How the Best Grid Pattern Is Derived," Mathematical Science No. 364, October 1993, pp. 56).

By using the same principles as above, the plane surfaces forming the chart 200 may be disposed in nonparallel to the imaging plane of the imaging apparatus 12, thereby making it possible to greatly vary the appearance of an image based on its position in the depth direction. As a result, a large amount of information can be obtained from a single captured image. The illustrated chart 200 is shaped such that the two plane surfaces (boards) are in contact with each other at a vertical line passing through the optical axis L and line-symmetric with respect to the optical axis L at an angle of θ/2. However, the shape of the chart 200 and its position and posture relative to the imaging apparatus 12 are not limited to the above description.

Figure 4:
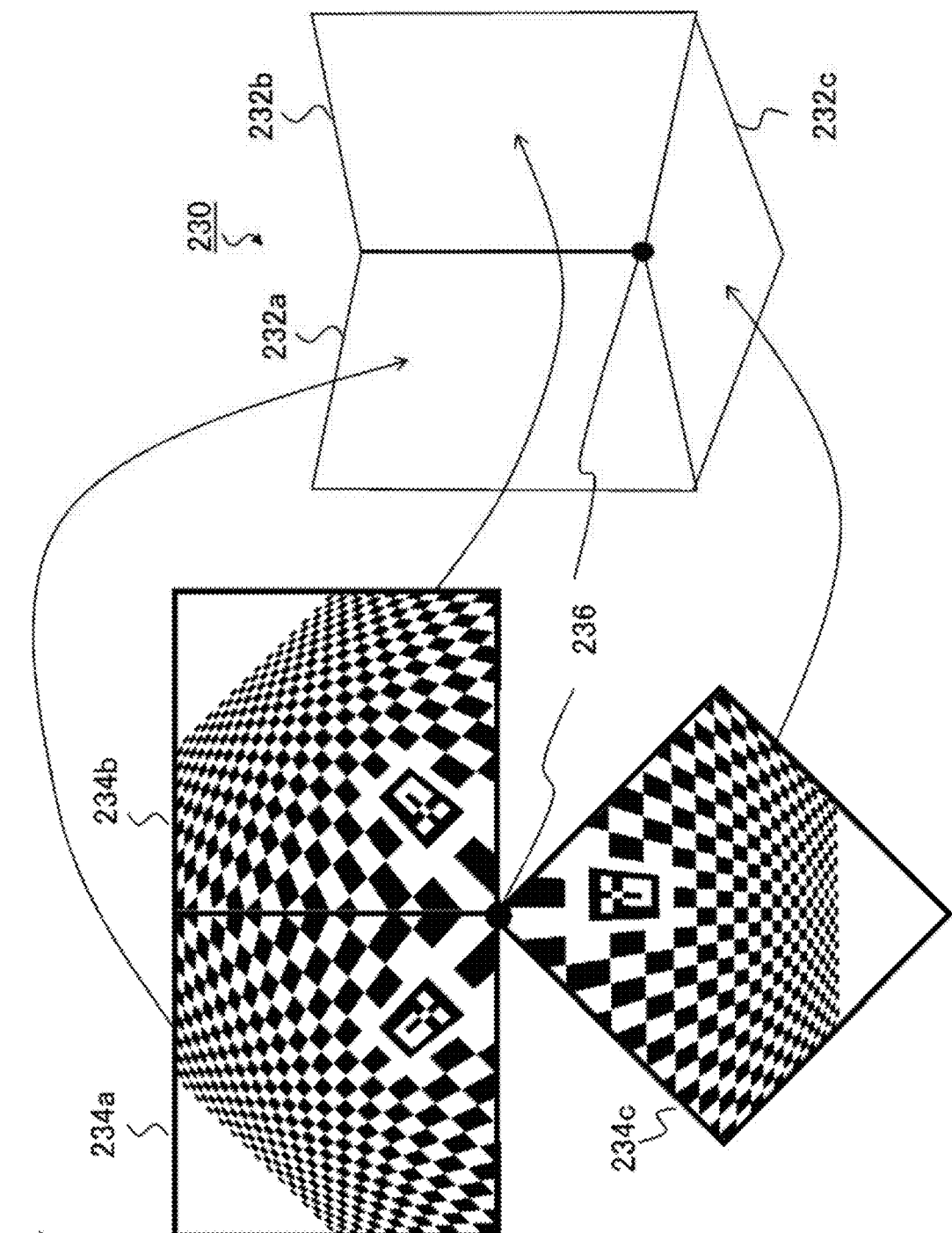
FIG. 4 is a diagram illustrating another example of the chart in the embodiment of the present invention.

FIG. 4 illustrates another example of the chart according to the present embodiment. As illustrated in the right portion of FIG. 4, the chart 230 depicted in the example of FIG. 4 includes three plane surfaces 232a, 232b, and 232c. More specifically, the chart 230 is structured such that the third plane surface 232c is disposed in contact with a base positioned in contact with the plane surfaces 232a and 232b associated with the two plane surfaces erected to form an angle of θ as illustrated in FIG. 2. Chart patterns 234a, 234b, and 234c are respectively depicted on the plane surfaces 232a, 232b, and 232c as illustrated in an exploded view in the left portion of FIG. 4.

In the above case, when the imaging apparatus 12 is disposed so as to overlook the plane surface 232c placed on the base, that is, orient the line of sight downward from the horizontal, the chart pattern depicted on the plane surface 232c is also imaged. Also in this instance, as mentioned earlier, the original checkered patterns are depicted in reverse perspective such that normal checkered patterns appear in a captured image. Consequently, as illustrated in FIG. 4, the farthest point 236 from the imaging plane is on a large scale, and the chart patterns contract increasingly with an increase in the distance from the farthest point 236.

Increasing the number of plane surfaces increases the amount of information available for camera parameter acquisition and thus achieves calibration with higher accuracy. However, an increased load is imposed on the feature point detection process. Therefore, the number of plane surfaces forming the chart is properly determined based, for example, on the accuracy of processing during an operation and the performance of a processing apparatus. Further, the angles formed by the plane surfaces are determined, for example, by experiment so that, as mentioned earlier, the vanishing points of parallel straight lines on the chart are close to the image center when an image is captured. In any case, the chart patterns according to the present embodiment are determined depending on the number of plane surfaces forming the chart 200 or 230 and on the positional and postural relation between the chart 200 or 230 and the imaging apparatus 12.

In other words, when it is determined that one chart pattern is to be used, only one positional and postural relation should be established between the chart 200 or 230 and the imaging apparatus 12. Therefore, the jig 14 is used to establish such relation. The chart patterns may be directly printed onto boards forming the chart 200 or 230, separately printed and attached to the boards, or projected onto the boards, for example, with a projector.

Configurations of a chart pattern generation apparatus and the calibration apparatus 10 will now be described. The chart pattern generation apparatus generates the chart patterns. The calibration apparatus 10 performs calibration by using the chart on which the generated chart patterns are depicted. These apparatuses may be independent apparatuses or integrated into a single apparatus having the functions of both apparatuses.

Figure 5:
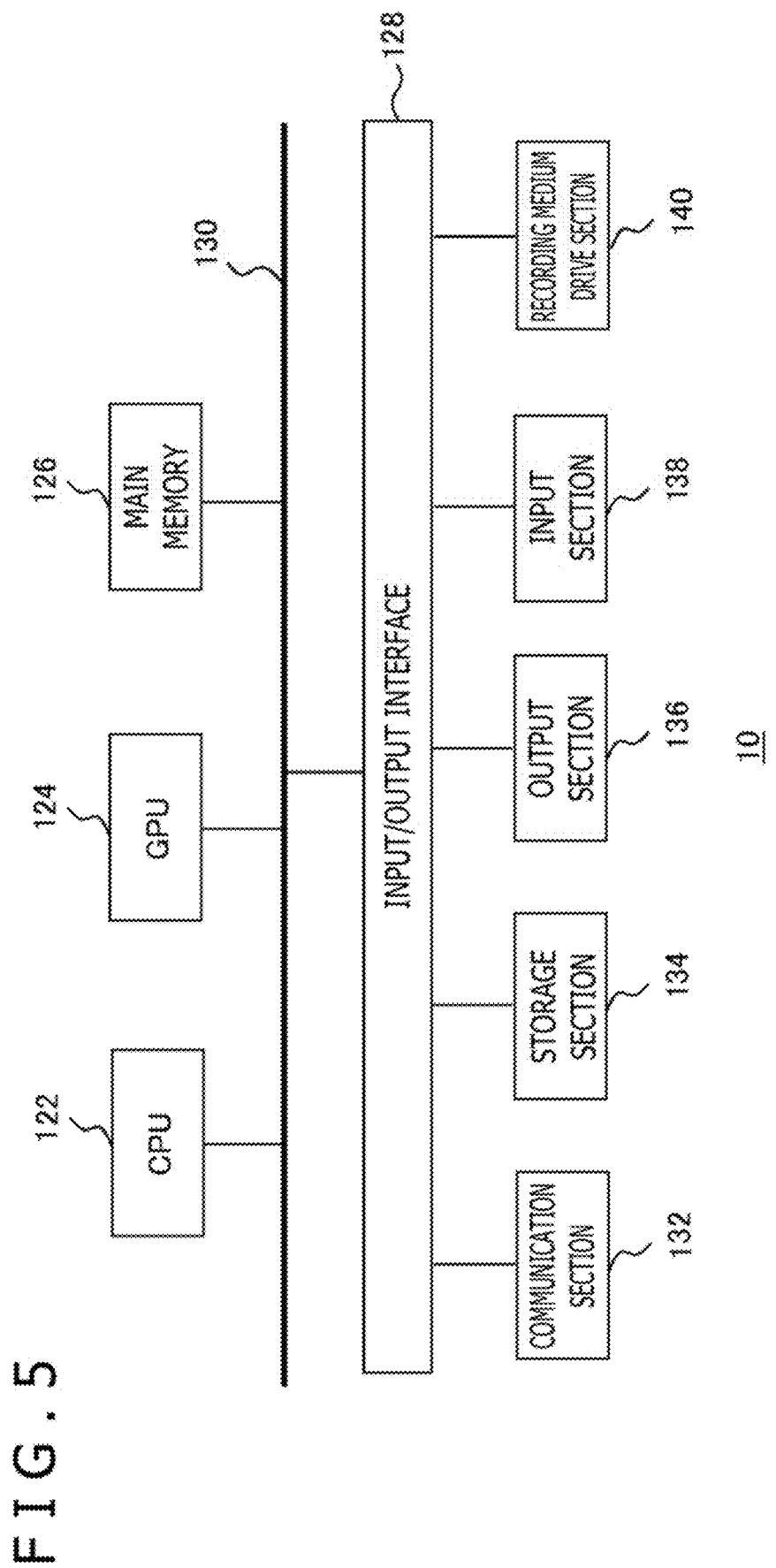
FIG. 5 is a diagram illustrating internal circuit configurations of a chart pattern generation apparatus and a calibration apparatus according to the embodiment of the present invention.

FIG. 5 illustrates internal circuit configurations of the chart pattern generation apparatus and calibration apparatus 10. The chart pattern generation apparatus and the calibration apparatus 10 include a central processing unit (CPU) 122, a graphics processing unit (GPU) 124, and a main memory 126. The CPU 122 controls the transmission of signals and the processing performed by elements in the chart pattern generation apparatus and calibration apparatus 10 in accordance with a program, for example, of an operating system or an application. The GPU 124 performs image processing. The main memory 126 includes a random-access memory (RAM) and stores programs and data required for processing.

The above-mentioned sections are interconnected through a bus 130. The bus 130 is further connected to an input/output interface 128. The input/output interface 128 is connected to a communication section 132 including a peripheral equipment interface such as a universal serial bus (USB) or Institute of Electrical and Electronics Engineers (IEEE) 1394 interface, or a network interface such as a wired or wireless local area network (LAN), a storage section 134 such as a hard disk drive or a nonvolatile memory, an output section 136 outputting data to the imaging apparatus 12 or to an output device (not depicted) such as a display device or a printer, an input section 138 inputting data from the imaging apparatus 12 or from an input device (not depicted), and a recording medium drive section 140 driving a magnetic disk or a removable recording medium such as an optical disk or a semiconductor memory.

The CPU 122 provides overall control of the chart pattern generation apparatus and the calibration apparatus 10 by executing the operating system stored in the storage section 134. Further, the CPU 122 executes various programs that are read from the removable recording medium and loaded into the main memory 126 or downloaded through the communication section 132. The GPU 124 functions as a geometry engine and as a rendering processor, and draws an image in accordance with a drawing command from the CPU 122.

Figure 6:
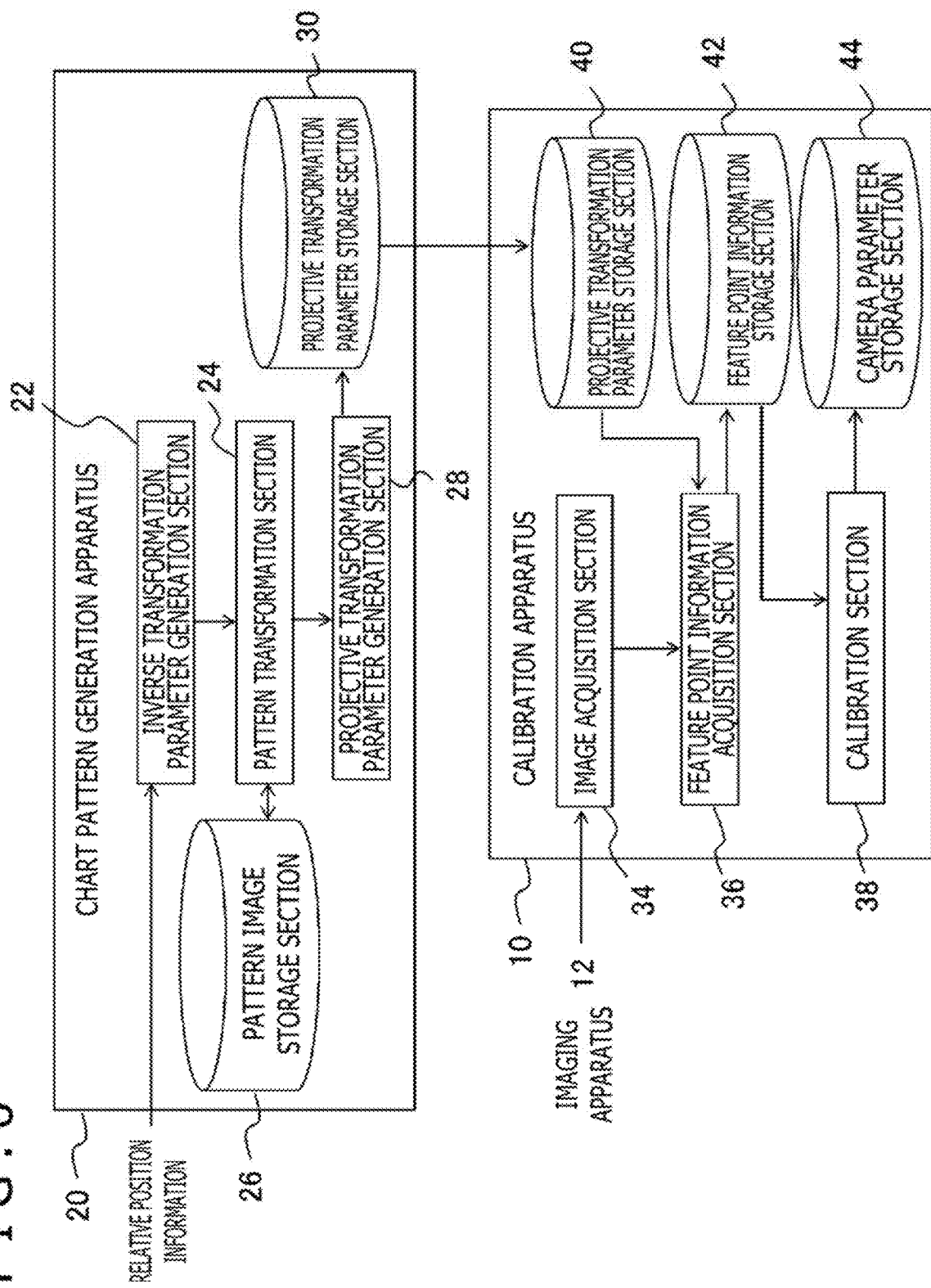
FIG. 6 is a diagram illustrating configurations of functional blocks of the chart pattern generation apparatus and the calibration apparatus according to the embodiment of the present invention.

FIG. 6 illustrates configurations of functional blocks of a chart pattern generation apparatus 20 and the calibration apparatus 10. The functional blocks depicted in FIG. 6 are implemented as hardware, for example, by the CPU 122, the GPU 124, and the main memory 126 depicted in FIG. 5, and implemented as software, for example, by a computer program loaded into the main memory from a hard disk or a recording medium. Therefore, it is understood by those skilled in the art that the functional blocks may be implemented by hardware alone, by software alone, or by a combination of hardware and software and are not to be limited to any of them.

The chart pattern generation apparatus 20 includes an inverse transformation parameter generation section 22, a pattern transformation section 24, a pattern image storage section 26, a projective transformation parameter generation section 28, and a projective transformation parameter storage section 30. The inverse transformation parameter generation section 22 generates a transformation parameter for depicting original chart patterns like normal checkered patterns in reverse perspective. The pattern transformation section 24 generates chart patterns by using the generated transformation parameter. The pattern image storage section 26 stores data regarding the original chart patterns and the transformed chart patterns. The projective transformation parameter generation section 28 generates a transformation parameter for acquiring position coordinates on each plane surface of the chart from an index given to a feature point within a pattern. The projective transformation parameter storage section 30 stores the generated transformation parameter.

The inverse transformation parameter generation section 22 acquires information regarding the positional and postural relation between the imaging apparatus 12 and the chart 200, and generates a transformation parameter performing transformation based on the distance from the imaging plane to each of the plane surfaces of the chart 200. The positional and postural relation may be preset or inputted as needed by the user. As mentioned earlier, the transformation parameter achieves transformation in such a manner as to cancel apparent size changes depending on the distance. More specifically, the inverse transformation parameter generation section 22 determines a homography matrix transforming, into four vertexes of a proper rectangle, four vertexes of a rectangle obtained by contracting a rectangle in an original chart pattern in reverse proportion to the distance. Details will be described later.

The pattern transformation section 24 performs, for each plane surface forming the chart 200, a process of transforming the chart patterns by using the transformation parameter generated by the inverse transformation parameter generation section 22. Therefore, the pattern image storage section 26 stores, in advance, image data regarding the original chart pattern in association with each plane surface. This ensures that the chart patterns depicted in (a) of FIG. 2 are generated. The pattern transformation section 24 stores generated data in the pattern image storage section 26. The stored data is outputted, for example, to a printer or a projector in accordance with a user operation, printed or subjected to image projection as needed, and used to implement the chart 200.

The projective transformation parameter generation section 28 generates, for each plane surface forming the chart, a transformation parameter transforming the indexes given to all feature points of the original chart pattern into position coordinates of the feature points of the chart patterns on the chart 200. From the viewpoint that the position coordinates of the feature points of the chart patterns on the chart 200 are position coordinates originally given to the chart, which is a real object, the position coordinates of the feature points of the chart patterns on the chart 200 may be regarded as the "three-dimensional (3D) model position coordinates" of the chart. However, the information required for calibration is available as far as the position coordinates on each plane surface of the chart 200 are known. Practically, therefore, two-dimensional position coordinates will suffice.

The transformation parameter generated by the projective transformation parameter generation section 28 is also a homography for transforming the position coordinates of an index in a coordinate system into the position coordinates of an associated feature point within a transformed chart pattern. When such an association is defined, the position coordinates of an actually captured image of a feature point can be associated with the 3D model position coordinates through an index at the time of calibration. The projective transformation parameter generation section 28 stores the generated parameter in the projective transformation parameter storage section 30. Alternatively, the projective transformation parameter generation section 28 may directly transmit the generated parameter to the calibration apparatus 10.

The calibration apparatus 10 includes an image acquisition section 34, a feature point information acquisition section 36, a projective transformation parameter storage section 40, a feature point information storage section 42, a calibration section 38, and a camera parameter storage section 44. The image acquisition section 34 acquires data regarding a captured image. The feature point information acquisition section 36 associates the position coordinates of a feature point within a captured image with the position coordinates of an associated feature point of a 3D model.

The projective transformation parameter storage section 40 stores a transformation parameter that is used to define such an association. The feature point information storage section 42 stores association information regarding a feature point. The calibration section 38 performs calibration by using the association information. The camera parameter storage section 44 stores a camera parameter that is obtained as a result of calibration.

The image acquisition section 34 acquires data regarding a captured image of the chart 200 from the imaging apparatus 12. In a case where the imaging apparatus 12 includes a multi-eye camera, the image acquisition section 34 acquires data regarding all images captured by individual imaging elements included in the multi-eye camera. The projective transformation parameter storage section 40 stores a transformation parameter that is stored in the projective transformation parameter storage section 30 of the chart pattern generation apparatus 20. A storage process may be manually performed by the user or performed by an automatic transmission from the chart pattern generation apparatus 20. An alternative is to supply a recording medium storing a transformation parameter together with the chart 200, and read and store data at the time of calibration.

The feature point information acquisition section 36 detects feature point and marker images from a captured image, and associates the position coordinates of the detected feature point image with the position coordinates of a feature point of a 3D model for each plane surface identified by the marker. In this instance, the feature point information acquisition section 36 determines the index of each feature point, and determines the 3D model position coordinates from the index by using the transformation parameter stored in the projective transformation parameter storage section 40. As a result, for each feature point, the position coordinates of the captured image are associated with the 3D model position coordinates.

Acquired association information is stored in the feature point information storage section 42. The calibration section 38 uses the association information regarding a feature point as input data and determines a camera parameter in accordance with an existing algorithm. The determined parameter is stored in the camera parameter storage section 44. Alternatively, the identified parameter may be transmitted to the imaging apparatus 12. When the camera parameter is retained in the imaging apparatus 12, a proper correction can be made in the imaging apparatus 12. As another alternative, the identified camera parameter may be transmitted to an information processing apparatus that processes information regarding, for example, a game by using an image captured by the imaging apparatus 12. This makes it possible to perform an analysis after making a proper correction, for example, by aligning an epipolar line with respect to a captured stereo image.

Figure 7:
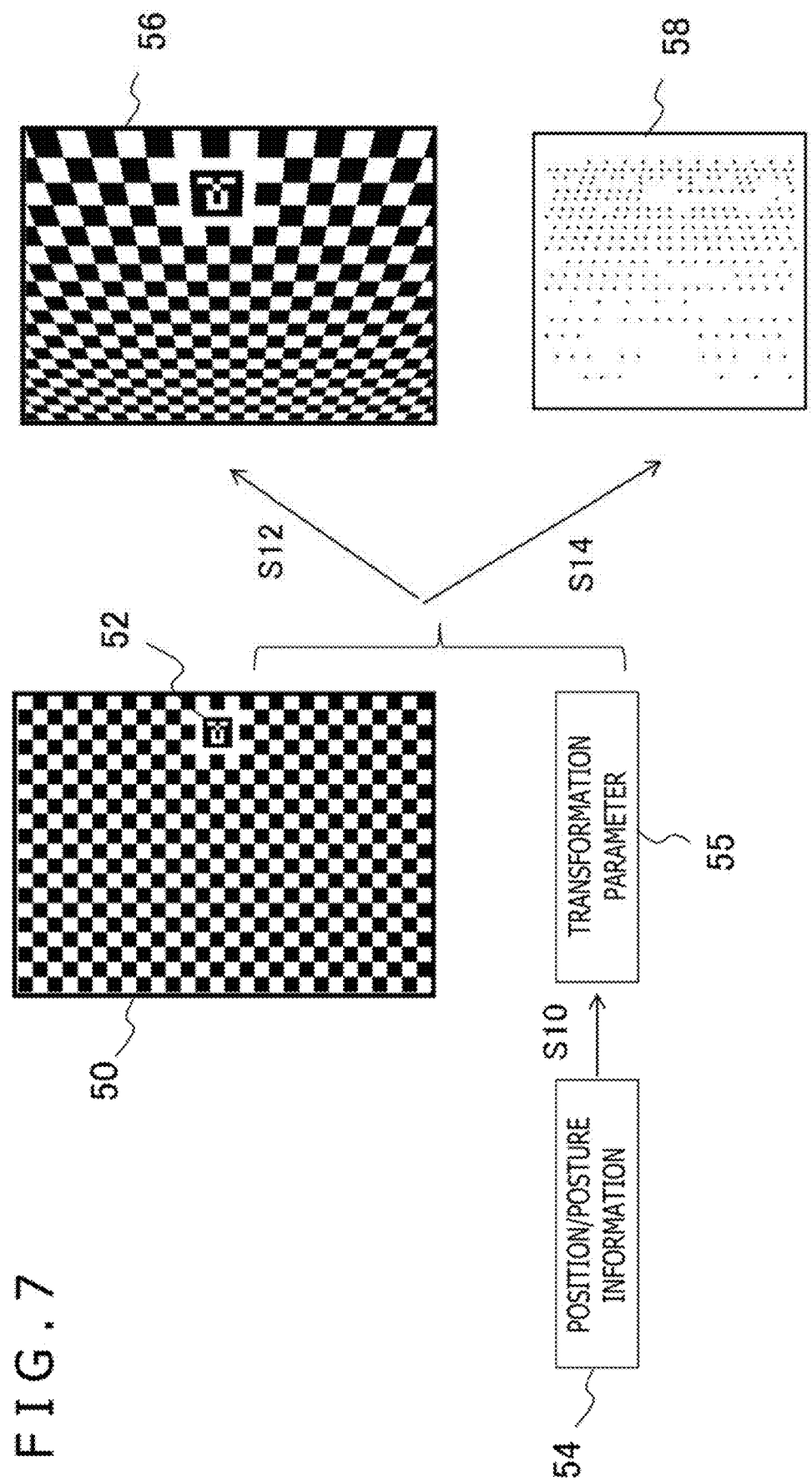
FIG. 7 is a diagram illustrating processing steps performed by the chart pattern generation apparatus according to the embodiment of the present invention.

FIG. 7 is a diagram illustrating processing steps performed by the chart pattern generation apparatus 20. The pattern image storage section 26 of the chart pattern generation apparatus 20 stores, in advance, data regarding an untransformed chart pattern 50 that is associated with an individual plane surface forming the chart 200. In the example of FIG. 7, the untransformed chart pattern includes a checkered pattern and a marker 52. The marker 52 is a graphical figure for identifying a plurality of plane surfaces forming the chart 200 within an image. Therefore, it is assumed that this graphical figure varies from one plane surface to another.

Upon acquiring position/posture information 54 regarding the positional and postural relation between the imaging apparatus 12 and the chart 200 in accordance with user input data or preset data, the inverse transformation parameter generation section 22 generates a transformation parameter 55 that cancels apparent size changes due to the difference in distance (step S10). The pattern transformation section 24 transforms an original chart pattern 50 by using the generated transformation parameter 55 to generate a chart pattern 56 based on the inclination of the chart (step S12). Although FIG. 7 depicts one chart pattern 56, the chart pattern is generated for each surface of the chart 200.

Further, the projective transformation parameter generation section 28 generates a homography matrix 58 for transforming a two-dimensional index of a feature point within the chart pattern into the 3D model position coordinates in the chart 200 (step S14). In the case of the depicted checkered pattern, feature points are vertexes of black and white squares. Within the untransformed chart pattern 50, the feature points are uniformly distributed in the horizontal and vertical directions. Therefore, such an array is regarded as an index coordinate system, and a two-dimensional index (i, j) is given to each feature point. In this instance, i and j are both integer values.

The homography matrix is then generated based on the relation between the index of a representative feature point and the position coordinates of an associated feature point within the 3D model of the chart 200 depicting the chart pattern 56. Using the generated homography matrix makes it easy to determine the position coordinates of all feature points within the 3D model from the index.

Figure 8:
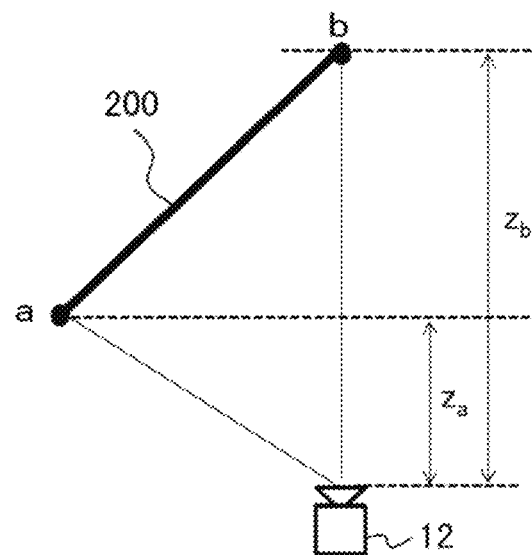
FIG. 8 is a diagram illustrating a method of transformation parameter generation by an inverse transformation parameter generation section in the embodiment of the present invention.
Figure 9:
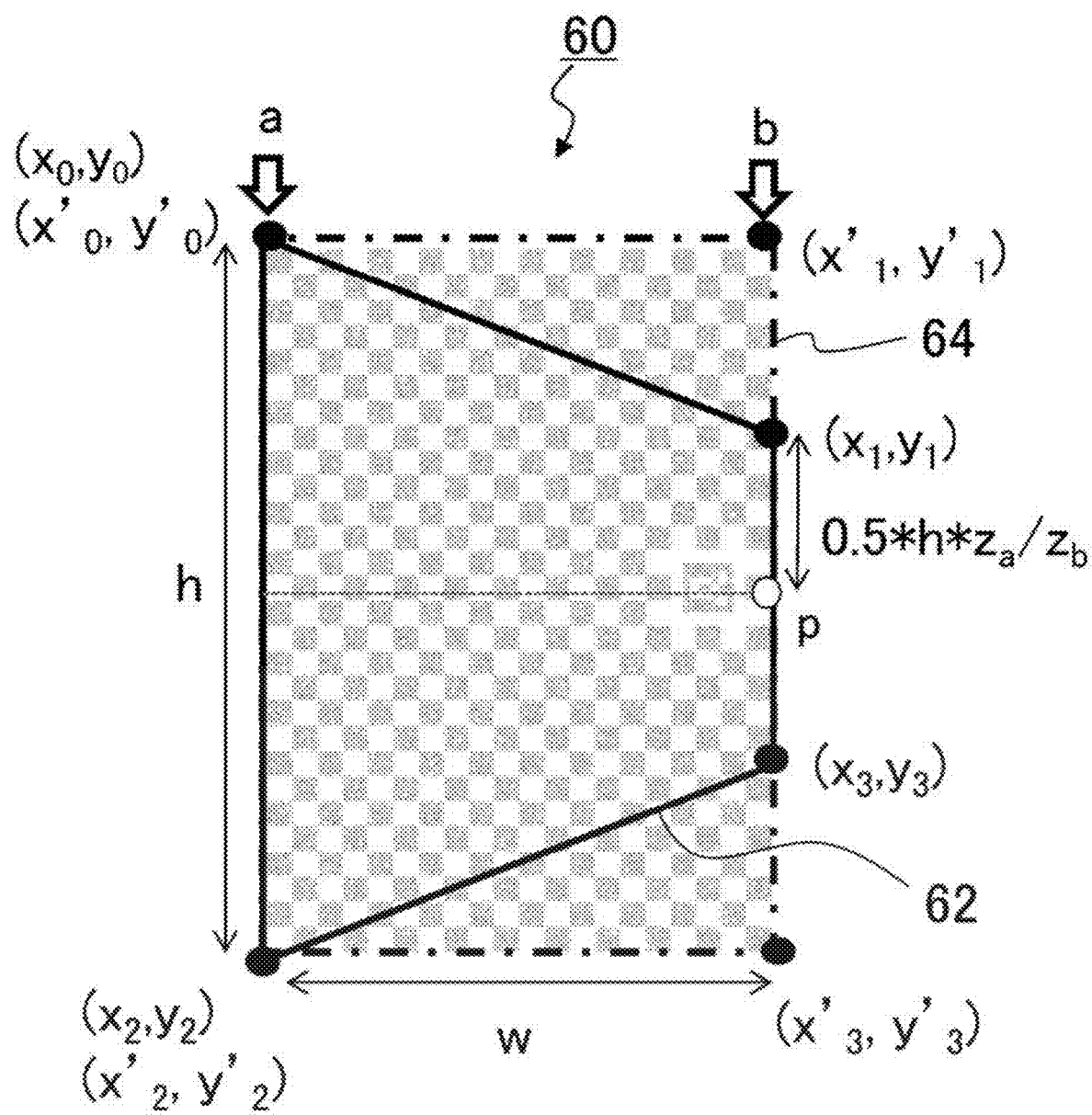
FIG. 9 is a diagram illustrating a method of transformation parameter generation by the inverse transformation parameter generation section in the embodiment of the present invention.

FIGS. 8 and 9 are diagrams each illustrating a method of transformation parameter generation by the inverse transformation parameter generation section 22. FIG. 8 is a schematic top view of the imaging apparatus 12 and one plane surface of the chart 200. Within the chart 200, a distance $z_a$ from the imaging plane of the imaging apparatus 12 to the nearest spot a and a distance $z_b$ to the farthest spot b are acquired based on the position/posture information 54 as illustrated in FIG. 8.

As mentioned earlier, the inverse transformation parameter generation section 22 acquires a transformation parameter that acquires an image of an untransformed chart pattern when a transformed chart pattern is displayed on an inclined chart and is imaged. For example, an apparent scale of the spot b is $z_a/z_b$ times that of the spot a. Therefore, when the reciprocal multiple of the apparent scale of the spot b is applied in advance, the patterns at the spots a and b are apparently the same size. The illustrated example is simplified for the sake of explanation. In a strict sense, a more optimal parameter can be acquired by performing perspective projection in consideration, for example, of the positional and postural relation between a plurality of imaging elements and the angle of view and lens distortion of each imaging element and making adjustments while calculating the shape of a pattern possibly depicted within a captured image.

FIG. 9 illustrates the virtual geometric shapes of an untransformed chart pattern and a transformed chart pattern. In a depicted chart pattern plane surface 60, a in FIG. 8 corresponds to the left side, and b in FIG. 8 corresponds to the right side. The height of the chart pattern is h, its width is w, and the upper left corner is the origin of the pattern plane surface. Projective transformation of an image to an image on a different plane surface is generally called homography. The homography matrix, which is a transformation parameter, can be determined by the association information regarding four points prevailing before and after transformation.

In the example of FIG. 9, attention is focused on the coordinates of four vertexes of chart patterns. Within the chart 200, as mentioned earlier, the chart patterns need to be expanded at a magnification that increases with an increase in the distance from the imaging plane, and expanded at a magnification of $z_b/z_a$ at the farthest point from the imaging plane. Therefore, a transformed chart patterns remaining out of untransformed chart patterns is a trapezoid 62 such that the height gradually decreases from a side a to a side b, and that the height at b is $h \cdot z_a/z_b$. The present example indicates a case where the optical axis exists at a point p, which is the midpoint of the side b. The shape of the trapezoid also varies with the position of the optical axis. Determining a homography matrix for transforming the trapezoid 62 into an original rectangle 64 makes it possible to properly transform the whole image.

The coordinates $(x_n, y_n)$ (n=0, 1, 2, 3) of four vertexes of the untransformed trapezoid 62 may be expressed as follows:

$$(x_0, y_0) = (0, 0)$$

$$(x_1, y_1) = (w, 0.5 \cdot h \cdot (1 - z_a/z_b))$$

$$(x_2, y_2) = (0, h)$$

$$(x_3, y_3) = (w, 0.5 \cdot h \cdot (1 + z_a/z_b))$$

Meanwhile, the coordinates $(x'_n, y'_n)$ (n=0, 1, 2, 3) of four vertexes of the transformed rectangle 64 may be expressed as follows:

$$(x'0, y'0) = (0, 0)$$

$$(x'1, y'1) = (w, 0)$$

$$(x'2, y'2) = (0, h)$$

$$(x'3, y'3) = (w, h)$$

The homography matrix H is defined as follows when a scaling factor is s.

$$H = \begin{pmatrix} h_{11} & h_{12} & h_{13} \\ h_{21} & h_{22} & h_{23} \\ h_{31} & h_{32} & 1 \end{pmatrix} \quad \text{[Math. 3]}$$

$$s \begin{pmatrix} x' \\ y' \\ 1 \end{pmatrix} = H \begin{pmatrix} x \\ y \\ 1 \end{pmatrix}$$

In a case where the vertex coordinates of the untransformed rectangle and transformed rectangle are defined as depicted in FIG. 9, the following equation is given.

$$\begin{pmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -y_2 x'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -y_3 x'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -y_4 x'_4 \\ 0 & 0 & 0 & x_4 & y_4 & 1 & -x_4 y'_4 & -y_4 y'_4 \end{pmatrix} \begin{pmatrix} h_{11} \\ h_{12} \\ h_{13} \\ h_{21} \\ h_{22} \\ h_{23} \\ h_{31} \\ h_{32} \end{pmatrix} = \begin{pmatrix} x'_1 \\ y'_1 \\ x'_2 \\ y'_2 \\ x'_3 \\ y'_3 \\ x'_4 \\ y'_4 \end{pmatrix} \quad \text{[Math. 4]}$$

When a matrix on the left of the left side is E and a matrix of the right side is F, E is a square matrix. Therefore, the homography matrix H is determined as indicated below:

$$H = E^{-1} F$$

Figure 10:
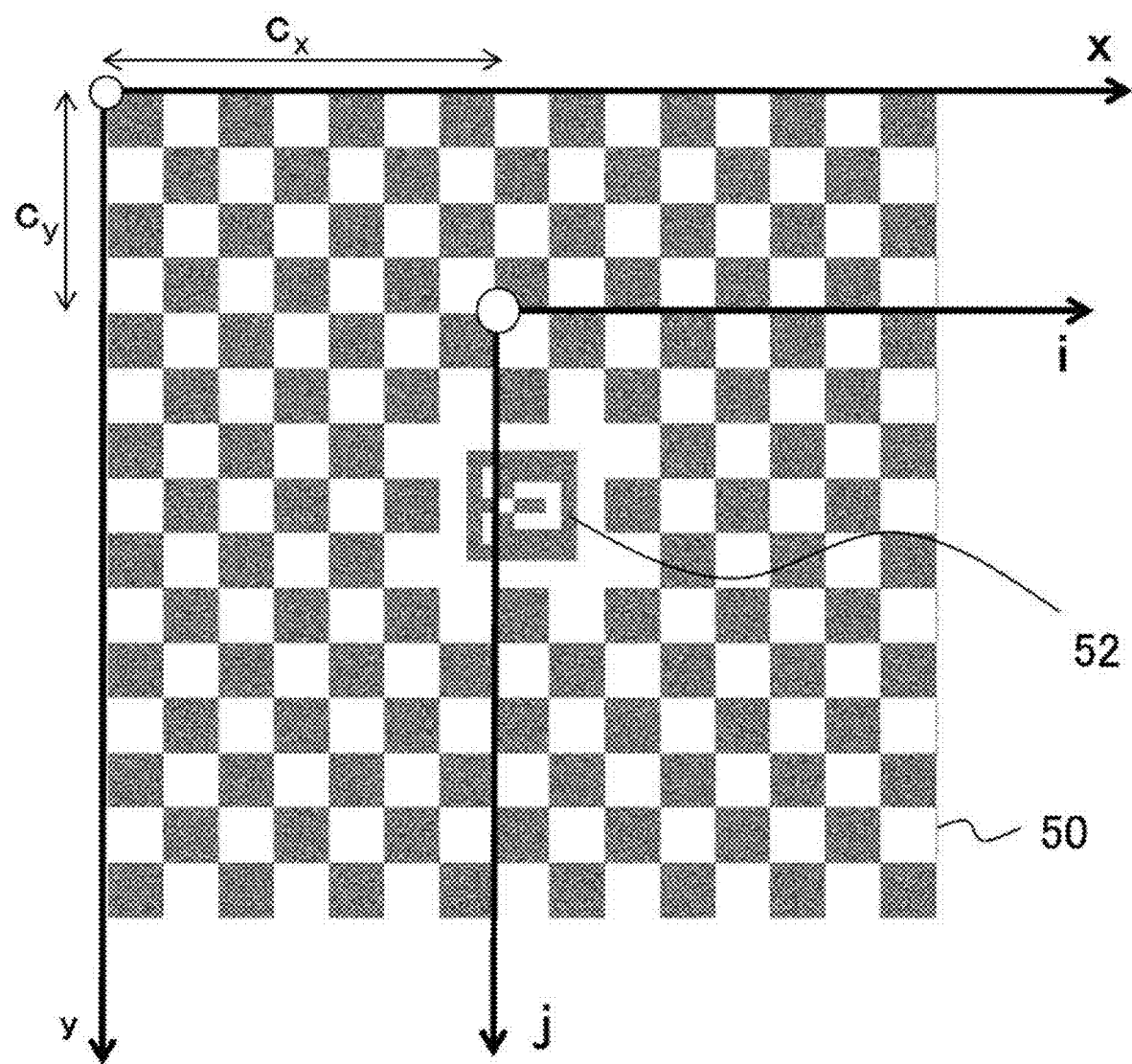
FIG. 10 is a diagram illustrating an index given to a feature point within a chart pattern in the embodiment of the present invention.

FIG. 10 is a diagram illustrating the index given to a feature point within a chart pattern. As mentioned earlier, at the time of calibration, the position of an image of a feature point within a captured image is associated with its position in the 3D model. Therefore, while the vicinity of the marker 52 within the chart pattern 50 is regarded as a reference point, an index identifying each feature point is given, and the 3D model position coordinates are made determinable by using the index as a key.

In the example of FIG. 10, the upper left vertex of the second square above the marker 52 is the origin of a coordinate system of the index (i, j). Meanwhile, in a system of position coordinates (x, y) based on the unit of a pixel on the image plane, the upper left corner of an image is the origin. In the present example, the origin (x, y)=(0, 0) of the coordinate system of the image corresponds to (i, j)=(−7, −4) in the index coordinate system. Conversely, the origin (i, j)=(0, 0) of the index coordinate system is positioned at (x, y)=(7*gridSize, 4*gridSize) of the image coordinate system.

Here, gridSize represents the number of horizontal and vertical pixels forming one square. For example, n=64. In this instance, the origin of the index coordinate system is positioned at (x, y)=(448, 256) of the image coordinate system. In FIG. 10, this position is ($C_x$, $C_y$). A generalized relation between the index (i, j) of a feature point and the position coordinates (x, y) of an image plane is as follows:

$$x = i \cdot \text{gridSize} + C_x$$

$$y = j \cdot \text{gridSize} + C_y$$

The projective transformation parameter generation section 28 generates a transformation parameter for acquiring the 3D model position coordinates in the chart 200 from the index of a feature point. The relation between the index (i, j) of a feature point and the position coordinates (x, y) of an image is as indicated by the above equation. Further, the position coordinates (x, y) in the untransformed chart pattern 50 can be transformed into the position coordinates (x', y') in the transformed chart pattern 56 by using the above-mentioned homography matrix H.

Moreover, position coordinates (x", y", z") based on the unit of length in the 3D model of the chart are determined as indicated below from the relation between pixel size and actual length:

$$x'' = x' \cdot \text{scale}$$

$$y'' = y' \cdot \text{scale}$$

$$z'' = 0$$

where scale represents the width of one pixel region. When length is expressed in millimeters, the value of scale is, for example, 0.25.

Consequently, the projective transformation parameter generation section 28 is able to obtain the homography matrix for transforming the index into the 3D model position coordinates by acquiring, for example, the index $(i_n, j_n)$(n=0, 1, 2, 3) of each of four vertexes of the chart pattern 50 and x and y components (x", y") of the associated 3D model position coordinates in the chart 200 and making an equation for the homography matrix H in the same manner as described earlier. The homography matrix is acquired for each plane surface forming the chart 200, associated with plane surface identification information, and stored in the projective transformation parameter storage section 30.

Figure 11:
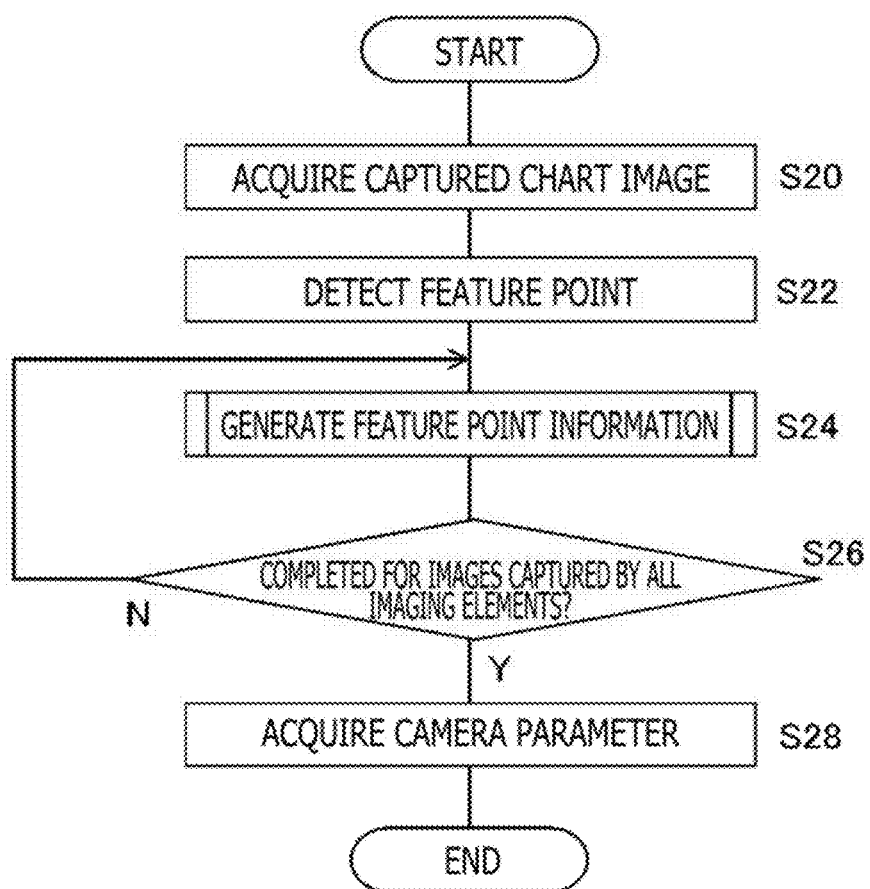
FIG. 11 is a flowchart illustrating processing steps that are followed when the calibration apparatus according to the embodiment of the present invention performs calibration on the basis of a captured image of the chart.

Operations of the calibration apparatus 10 will now be described. FIG. 11 is a flowchart illustrating processing steps that are followed when the calibration apparatus 10 according to the present embodiment performs calibration based on a captured image of the chart 200. First of all, the image acquisition section 34 acquires data regarding a captured image from the imaging apparatus 12 (step S20). When the imaging apparatus 12 includes a multi-eye camera such as a stereo camera, the image acquisition section 34 acquires data regarding an image captured by each imaging element in the multi-eye camera.

Alternatively, the image acquisition section 34 may acquire data regarding a plurality of images captured under the same imaging conditions. In this instance, the image acquisition section 34 may perform a noise reduction process by adding individual frame images together. For example, the image acquisition section 34 may acquire an average value by adding images of 16 frames for each associated pixel, and generate an image by using the acquired average value as a pixel value.

Next, the feature point information acquisition section 36 extracts an image of a feature point from the captured image (step S22). Various methods for detecting the vertexes of squares in a checkered pattern as feature points are put to practical use. Any of them may be used in this instance. When, for example, a method based on a Harris feature amount is used, feature points having a feature amount not smaller than a predetermined value are extracted as the vertexes (corners) of squares (refer to C. Harris and M. Stephens, "A combined corner and edge detector," Proceedings of the 4th Alvey Vision Conference, 1988, pp. 147 to 151).

In some cases, however, position coordinates determined by the above method are not sufficiently accurate. It is therefore preferable that two edge brightness gradients be used to acquire position coordinates (u, v) in a captured image with sub-pixel accuracy. For this processing, a typical open source image processing software library, such as the cv::FindCornerSubPix( ) function of an open source computer vision library (OpenCV), may be used.

Further, the feature point information acquisition section 36 determines the index of each feature point in accordance with the positional relation to the image of a marker, and transforms the determined index to the position coordinates in the chart 200 by using the homography matrix acquired from the chart pattern generation apparatus 20. Accordingly, the feature point information acquisition section 36 generates feature point information indicative of the association between the position coordinates in a captured image of a feature point and the 3D model position coordinates in the chart 200 (step S24).

In the above instance, plane surfaces forming the chart 200 are identified in accordance with the graphical figure of the marker, and the homography matrix associated with each plane surface is read from the projective transformation parameter storage section 30 and used. In a case where a multi-eye camera is used, the processing in step S14 is repeated for images captured by all the individual imaging elements included in the multi-eye camera ("N" at step S26). When the feature point information is generated for all the images captured by the individual imaging elements ("Y" at step S26), the calibration section 38 performs calibration by using the generated feature point information and acquires the camera parameter (step S28).

For the above calibration processing, an existing technology described, for example, in NPL 1 may be used. Therefore, the subsequent description will be focused on the processing in step S14. This processing is performed with respect to a captured image in order to conduct a search on an increasingly large area around a marker image, associate the indexes with the position coordinates of images of all feature points, and thus associate the position coordinates of images of all feature points with the 3D model position coordinates in the chart 200.

Figure 12:
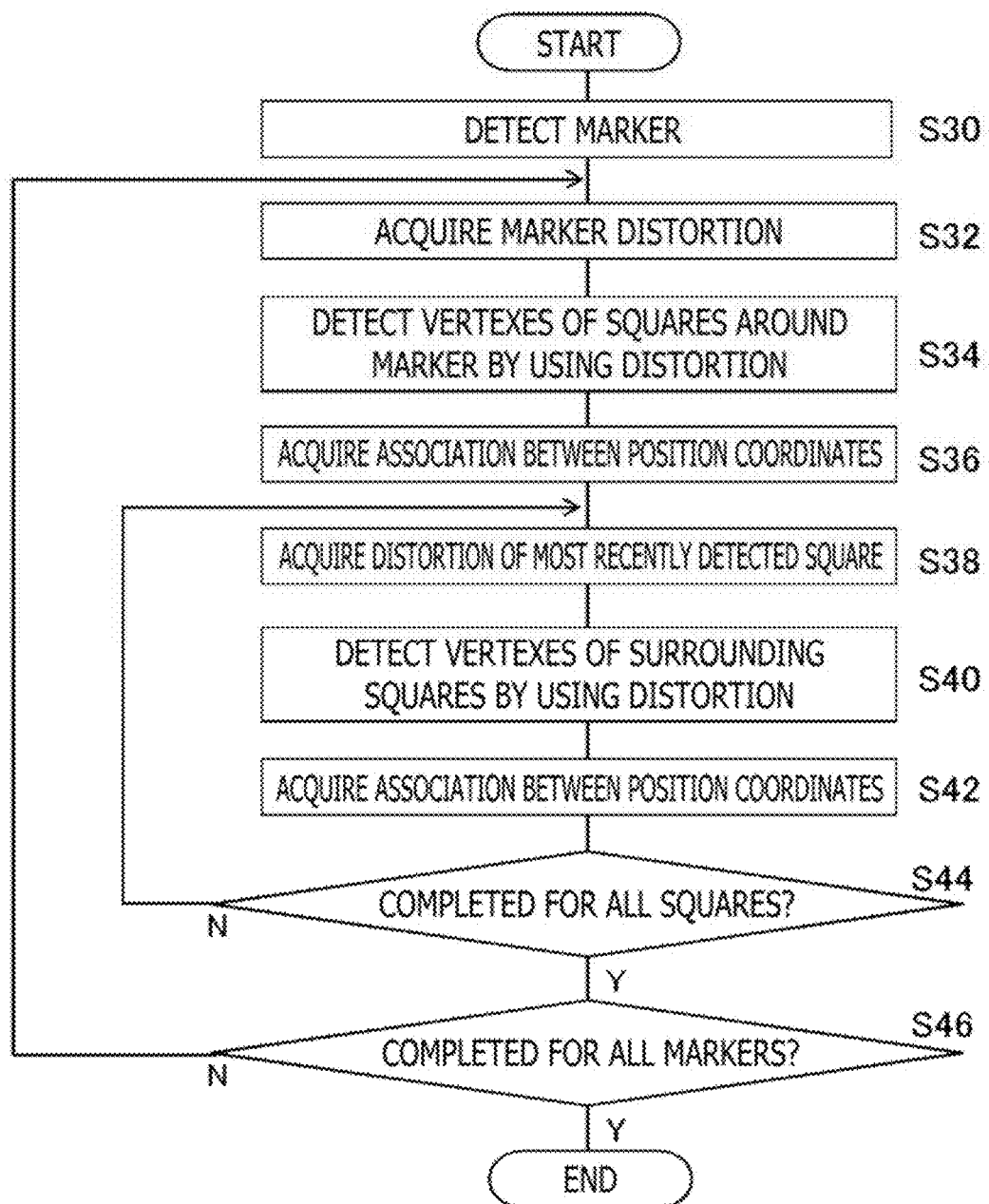
FIG. 12 is a flowchart illustrating processing steps that are followed when a feature point information acquisition section generates feature point information in step S14 of FIG. 11.

FIG. 12 is a flowchart illustrating processing steps that are followed when the feature point information acquisition section 36 generates the feature point information in step S14 of FIG. 11. First of all, the feature point information acquisition section 36 detects an image of a marker in a captured image (step S30). This detection process may be performed in the manner as for an AR (augmented reality) technology that detects a marker written, for example, on a board in the real world and draws in a captured image a virtual object corresponding to the detected marker. For example, the ArUco Marker technology may be used (refer to S. Garrido-Jurado et al. "Automatic generation and detection of highly reliable fiducial markers under occlusion" Pattern Recognition, Vol. 47, No. 6. 2014, June, pp. 2280 to 2292).

Next, the feature point information acquisition section 36 acquires a parameter indicative of distortion within an image of one detected marker (step S32). More specifically, the feature point information acquisition section 36 acquires a homography matrix that transforms four vertexes of a rectangle having horizontal and vertical sides, which should originally appear as a marker image, into four vertexes of an actual marker image.

Next, the vertexes of squares around the marker regarded as a reference point are detected (step S34). In this instance, when the four vertexes of a square, which should originally appear as an image of the square, are transformed by using the homography matrix acquired in step S32, the approximate positions of the four vertexes can be determined in consideration of distortion in the vicinity of the four vertexes. A search is then conducted to detect feature points effectively detected around the transformed position coordinates (e.g., within a range of approximately 0.5 pixels). The indexes of the detected feature points are obvious from the positional relation to the marker. Consequently, as a result of this processing, the indexes are associated with the position coordinates (u, v) of feature points in a captured image.

Next, the 3D model position coordinates (x", y", z") (z"=0) are determined from the above-mentioned indexes to associate the position coordinates (u, v) of the feature points with the 3D model position coordinates (x", y", z") (step S36). The homography matrix of a plane surface associated with the marker, which is stored in the projective transformation parameter storage section 40, is used to transform the position coordinates. Next, a parameter indicative of distortion of a square detected in step S34 is acquired (step S38). More specifically, as is the case with step S32, the homography matrix for transforming the four vertexes of the square, which should originally appear as an image of the square, into the four vertexes of an actual image of the square.

Next, the vertexes of squares around the above-mentioned square regarded as a reference point are detected (step S40). In this instance as well, when the four vertexes of a square, which should originally appear as an image of the square, are transformed by using the homography matrix acquired in step S38, the approximate positions of the vertexes of the squares can be determined in consideration of distortion in the vicinity of the four vertexes. A search is then conducted to detect feature points effectively detected around the transformed position coordinates. Accordingly, the indexes are associated with the position coordinates (u, v) of the feature points.

Next, as is the case with step S36, the indexes (i, j) are transformed into the 3D model position coordinates (x", y", z") by using the homography matrix, and stored in association with the position coordinates (u, v) of the feature points in the captured image (step S42). Steps S38 to S42 are then repeated for all squares depicted on the same plane surface ("N" at step S44). When the association information regarding the vertexes of all the squares, namely, the feature points, is generated ("Y" at step S44), steps S32 to S44 are repeated for plane surfaces associated with the other markers detected in step S30 ("N" at step S46). When the feature point information is generated for all the detected markers and thus all the plane surfaces and then stored in the above manner, the processing terminates ("Y" at step S46).

Figure 13:
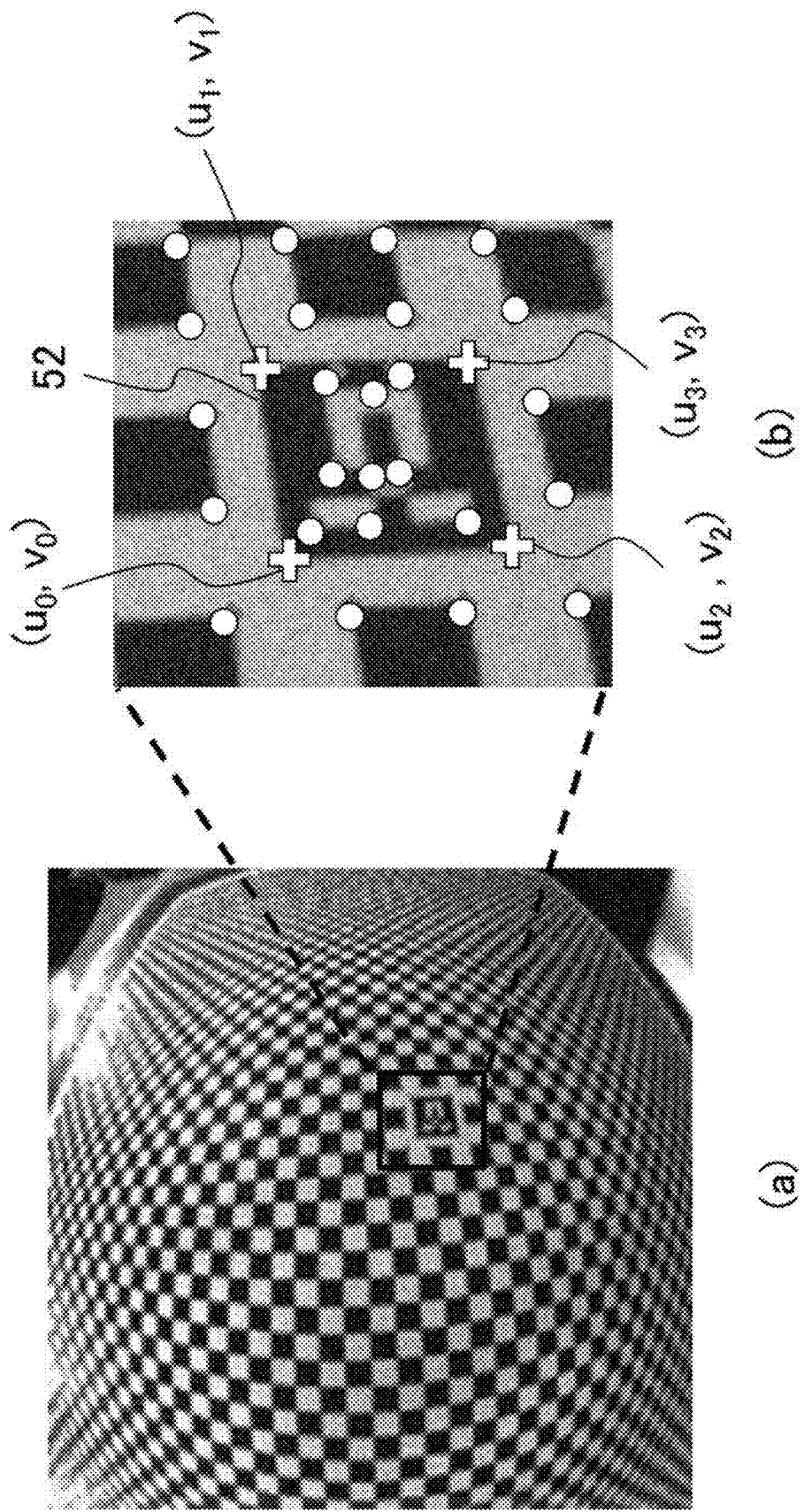
FIG. 13 is a diagram illustrating a marker and squares in a captured image of the chart in the embodiment of the present invention.

FIG. 13 illustrates a marker and squares in a captured image of the chart 200. Depicted in (a) of FIG. 13 is an example of the whole captured image of only one surface of the chart 200. Depicted in (b) of FIG. 13 is an enlarged view of a region in the vicinity of a marker on the surface of the chart 200. When step S22 of FIG. 11 is performed, feature points viewable in a captured image depicted in (a) of FIG. 13, namely, the vertexes of a square forming a checker in the present example, are detected. In (b) of FIG. 13, the positions of feature points are indicated by white circles.

However, highlighting is used for ease of understanding. In fact, detailed position coordinates are determined in sub-pixel units. The same also applies to the subsequent description. Further, when step S30 in FIG. 12 is performed, an image of the marker 52 is detected. The position coordinates $(u_0, v_0)$, $(u_1, v_1)$, $(u_2, v_2)$, $(u_3, v_3)$ of the four vertexes of the marker 52 are then determined as indicated by the crosses in FIG. 13.

Figure 14:
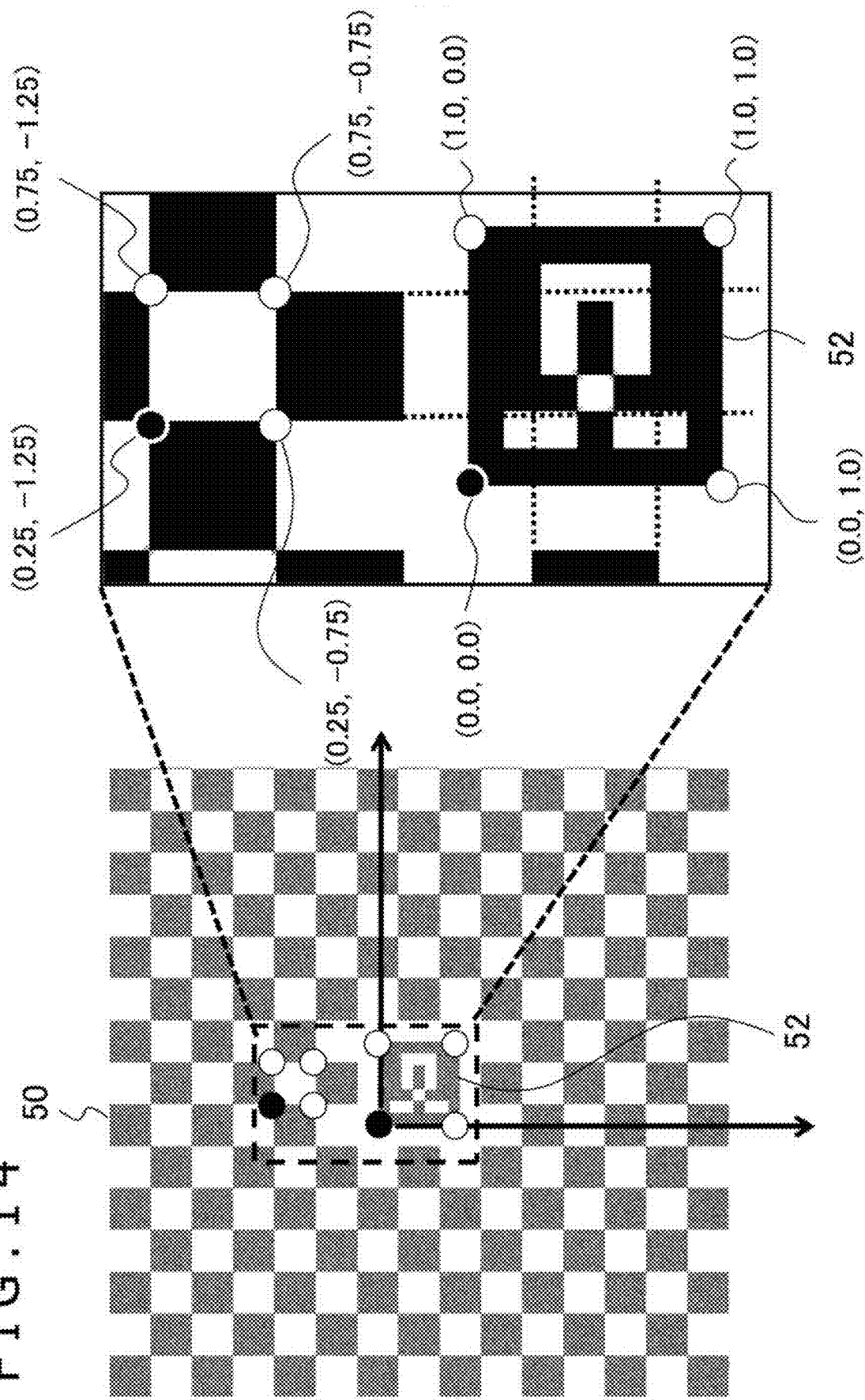
FIG. 14 is a diagram illustrating a reference coordinate system for detecting, in step S34 of FIG. 12, the vertexes of a square in consideration of image distortion in the vicinity.

FIG. 14 is a diagram illustrating a reference coordinate system for detecting, in step S34 of FIG. 12, the vertexes of a square in consideration of image distortion in the vicinity. As mentioned thus far, a chart pattern depicted on the chart 200 is projectively transformed in consideration of plane surface inclination with respect to a captured image. As a result, an image of the chart pattern within the captured image is similar under normal conditions to the depicted image of the chart pattern 50 that is not projectively transformed. How the image of the chart pattern within the captured image is distorted within an actual captured image is determined by using a homography matrix based on the state of the chart pattern 50.

Accordingly, in the chart pattern 50, the upper left vertex indicated by a black circle, which is among the vertexes of the marker 52, is regarded as the origin to define a coordinate system based on the unit of length of one side of the marker as the "marker normalized coordinate system." As enlarged in the right portion of FIG. 14, the position coordinates of the four vertexes of the marker in the marker normalized coordinate system are (0.0, 0.0), (1.0, 0.0), (0.0, 1.0), and (1.0, 1.0). Determined is a homography matrix for transforming the position coordinates of vertexes in the above-mentioned marker normalized coordinate system into the position coordinates of vertexes of a marker image actually derived from a captured image.

As a marker detection process has determined the association between the untransformed position coordinates of four vertexes and the transformed position coordinates of the four vertexes, a homography matrix can be determined in the same manner as described above. It is conceivable that an area around the marker 52 is similarly distorted. Therefore, when the vertexes of surrounding squares are searched for, the above-mentioned homography matrix is used to transform the position coordinates of the vertexes of the squares. More specifically, the position coordinates close to those of actual vertexes in a captured image can be acquired by transforming the position coordinates of the vertexes of squares in the marker normalized coordinate system in accordance with distortion.

In the example of FIG. 14, the position coordinates of four vertexes of the second square above the marker 52 in the marker normalized coordinate system are (0.25, −1.25), (0.75, −1.25), (0.25, −0.75), and (0.75, −0.75). However, the squares in a checkered pattern is ¼ the size of the marker, and have the same central axis as the marker. The upper left vertex of the second square above the marker 52 is the origin of the index of a feature point. The indexes of the other vertexes are determined from the relation to such an origin. Position coordinates obtained by transforming the position coordinates of these vertexes by the homography matrix determined from the marker indicate the approximate position where an image of a feature point should be placed in a captured image.

Consequently, determining a feature point positioned closest to transformed position coordinates in a captured image makes it possible to associate an index with the position coordinates of a feature point in an actual image. Then, as mentioned above, when the 3D model position coordinates are determined by using the index as a key, information regarding the association of the position coordinates of the feature point can be acquired. When the feature point information regarding the vertexes of squares positioned above, below, and to the left and right of the marker 52 is acquired, the range of feature points whose feature point information has been acquired is expanded by repeating the same processing with such squares regarded as a reference point.

Figure 15:
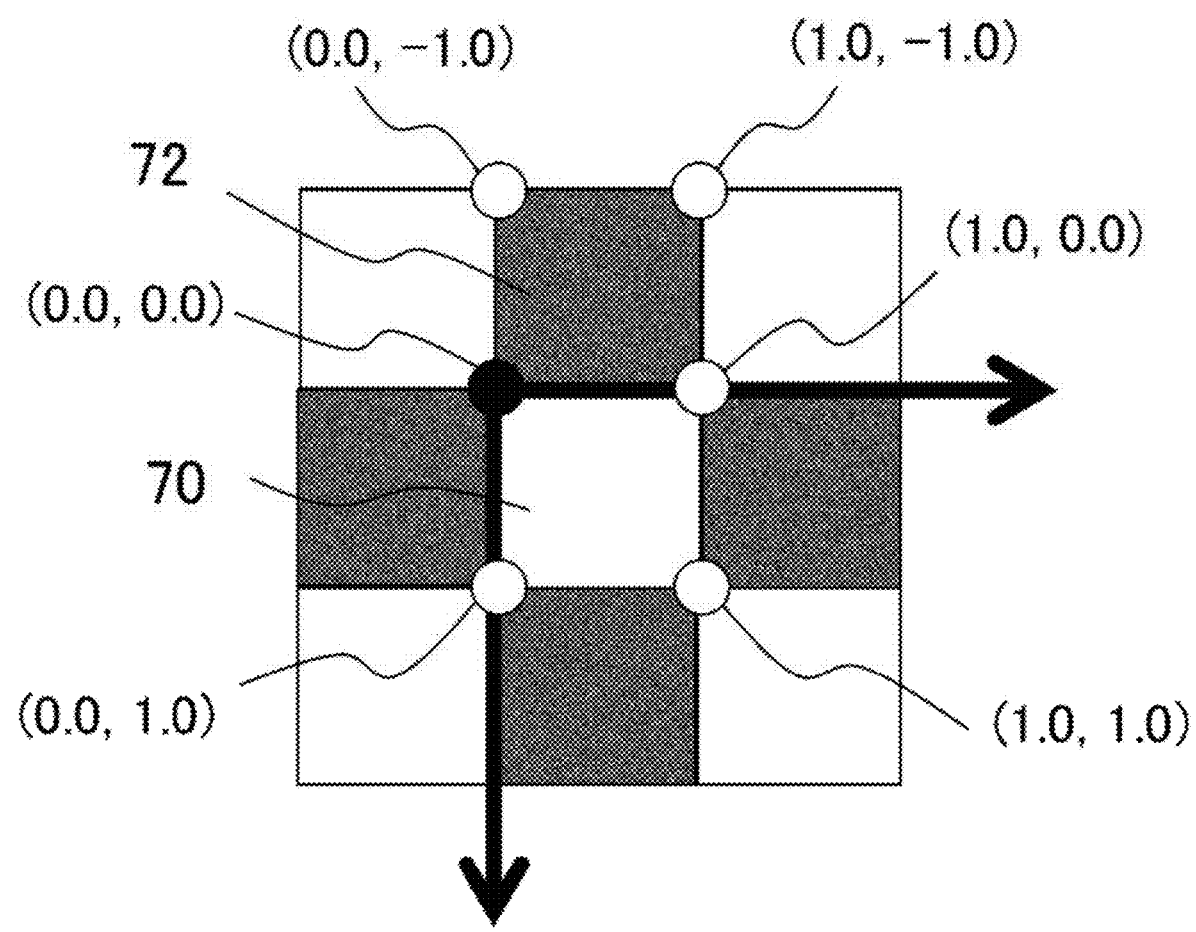
FIG. 15 is a diagram illustrating a process that is performed in step S40 of FIG. 12 in order to determine position coordinates of vertexes of squares around a square defined as a reference point in a checkered pattern.

FIG. 15 is a diagram illustrating a process that is performed in step S40 of FIG. 12 in order to determine the position coordinates of vertexes of squares around a square defined as a reference point in a checkered pattern. In a case where a square 70 is regarded as a referent point while its upper left corner is the origin of the index described with reference, for example, to FIG. 14, a coordinate system that has its origin at the upper left vertex indicated by a black circle among the vertexes of the square 70 and is based on the unit of length of one side of the square is defined as the "reference point square normalized coordinate system."

In the reference point square normalized coordinate system, the position coordinates of four vertexes of the square 70 regarded as the referent point are (0.0, 0.0), (1.0, 0.0), (0.0, 1.0), and (1.0, 1.0). Four vertexes of squares positioned above, below, and to the left and right of the square 70 regarded as the reference point are then checked to detect a vertex whose feature point information is not generated. For example, in the case of a square 72 positioned above the square 70 regarded as the reference point, feature point information regarding vertexes of the square 72 that are identical with those of the square 70 among four vertexes of the square 72 is already acquired. Therefore, the process is performed on the remaining two vertexes.

More specifically, a homography matrix indicative of distortion of the square 70 regarded as the reference point is obtained, and the approximate positions of the two target vertexes in a captured image are determined by transforming the position coordinates (0.0, −1.0), (1.0, −1.0) of the two target vertexes through the use of the obtained homography matrix. A feature point positioned closest to the position coordinates is then detected to generate the association information as mentioned earlier. When a normalized coordinate system is subsequently defined with the square 72 regarded as a reference point, feature point information regarding the vertexes of squares around the square 72 can be further generated. When the reference point is sequentially changed from one square to another in the above-described manner, it is possible to efficiently acquire feature point information regarding almost all feature points viewable in a captured image.

FIG. 16 illustrates an exemplary data structure of feature point information stored in the feature point information storage section 42. The feature point information 80 includes a camera identification (ID) field 82, a plane surface ID field 84, an index field 86, a two-dimensional (2D) position coordinate field, and a 3D position coordinate field 90. The camera ID field 82 presents information for camera identification in a case where a multi-eye camera is used as the imaging apparatus 12, and is acquired from the imaging apparatus 12 as additional data regarding a captured image.

The example of FIG. 16 assumes that a stereo camera is used as the imaging apparatus and assigned two identification numbers, namely, "0" and "1." The plane surface ID field 84 presents information for identifying plane surfaces forming the chart 200, and determines on the basis of an image of a marker in a captured image. In the example of FIG. 16, identification numbers, such as "0," "1," and so on, are given. Each identification number is associated beforehand with the graphical figure of a marker. When the chart 200 includes two plane surfaces, their identification numbers are "0" and "1."

The index field 86 indicates the index of a feature point that is uniquely given within a plane surface identified by the marker. In a case where the origin of the index is set in the vicinity of the marker 52 as depicted in FIG. 10, the index may take a negative value. The example of FIG. 16 assumes that integers from −m to n are given in both the horizontal and vertical directions. The 2D position coordinate field 88 indicates the position coordinates of each feature point image within a captured image. The example of FIG. 16 assumes that N+1 feature points exist in both the horizontal and vertical directions, and that the values of coordinates are indicated by subscripts.

The 3D position coordinate field 90 indicates the position coordinates of a feature point in the 3D model of the chart 200. Information presented in this field is three-dimensional. However, z" may be zero because the information in this field indicates a position on a plane surface included in the chart 200. Coordinate values are indicated by the same subscripts to those of the 2D position coordinate field 88. The format of a value in each field is not limited to those depicted in FIG. 16.

The calibration section 38 uses the feature point information 80 to acquire the camera parameter by a predetermined method. When, for example, the method by Zhang is used, feature point information regarding a plurality of plane surfaces in an image captured by a single imaging operation may be used instead of feature point information related to plane chart images captured from multiple viewpoints. As the rotation matrix and the translation vector are simultaneously acquired, an external parameter indicative, for example, of the relation between imaging elements of a multi-eye camera, can be acquired based on the acquired rotation matrix and translation vector. The cv::CalibrateCamera( ) function of OpenCV may be used as the method of determining the rotation matrix and the translation vector.

Figure 17:
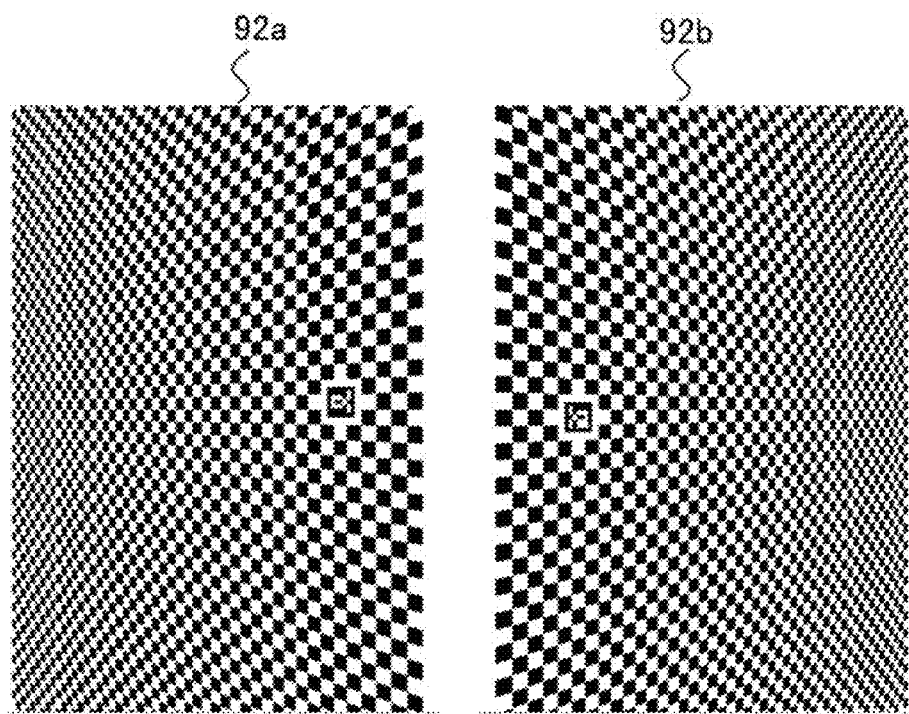
FIG. 17 is a diagram illustrating chart patterns generated by the chart pattern generation apparatus according to the embodiment of the present invention.

Results of experiments will now be described. FIG. 17 illustrates chart patterns generated by the chart pattern generation apparatus 20. FIG. 17 assumes that a set of two plane surfaces is used as the chart 200, and that a left chart pattern 92a and a right chart pattern 92b are generated for the two respective plane surfaces. In a case where the plane surfaces are erected in line symmetry with respect to a vertical line passing through the optical axis of the imaging apparatus 12 as depicted in FIG. 2, the right side of the left chart pattern 92a and the left side of the right chart pattern 92b are at the farthest distance from the imaging plane. Therefore, the squares of the chart patterns are depicted in reverse perspective in accordance with a change of the distance from the imaging plane.

Figure 18:
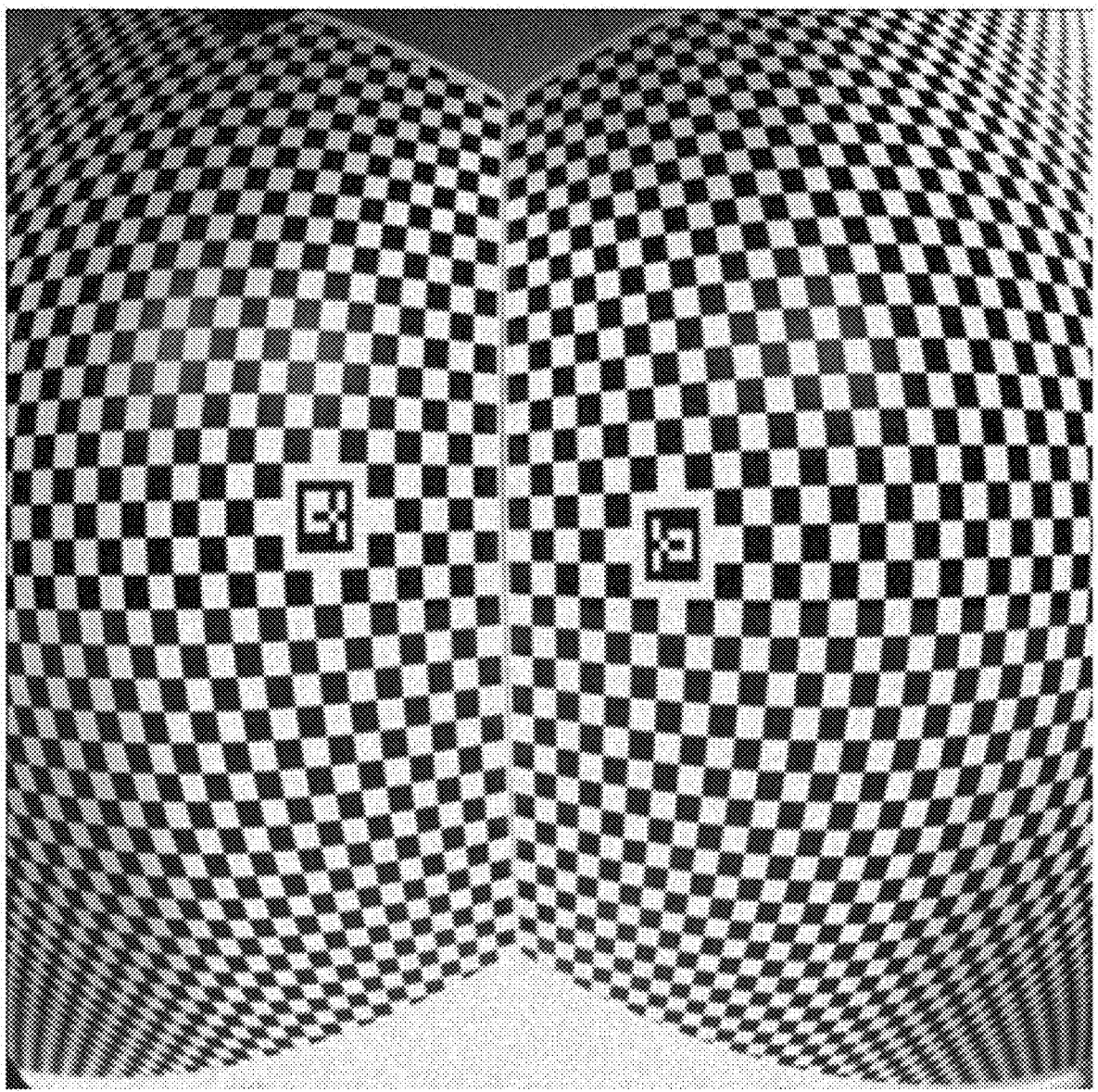
FIG. 18 is a diagram depicting a captured image of the chart that is captured by a wide-angle camera in the embodiment of the present invention.

FIG. 18 depicts a captured image of the chart 200 that is captured by a wide-angle camera. In the vicinity of the center of the captured image, images of squares forming a checkered pattern are substantially arrayed orthogonally and uniformly. However, the shapes of the squares are distorted increasingly with a decrease in distance to an edge of the captured image. The reason is that, as mentioned earlier, the employed projection method differs from that of a regular camera. When the captured image is as described above, the index of a feature point is not easily determined by conducting a simple horizontal/vertical search.

Figure 19:
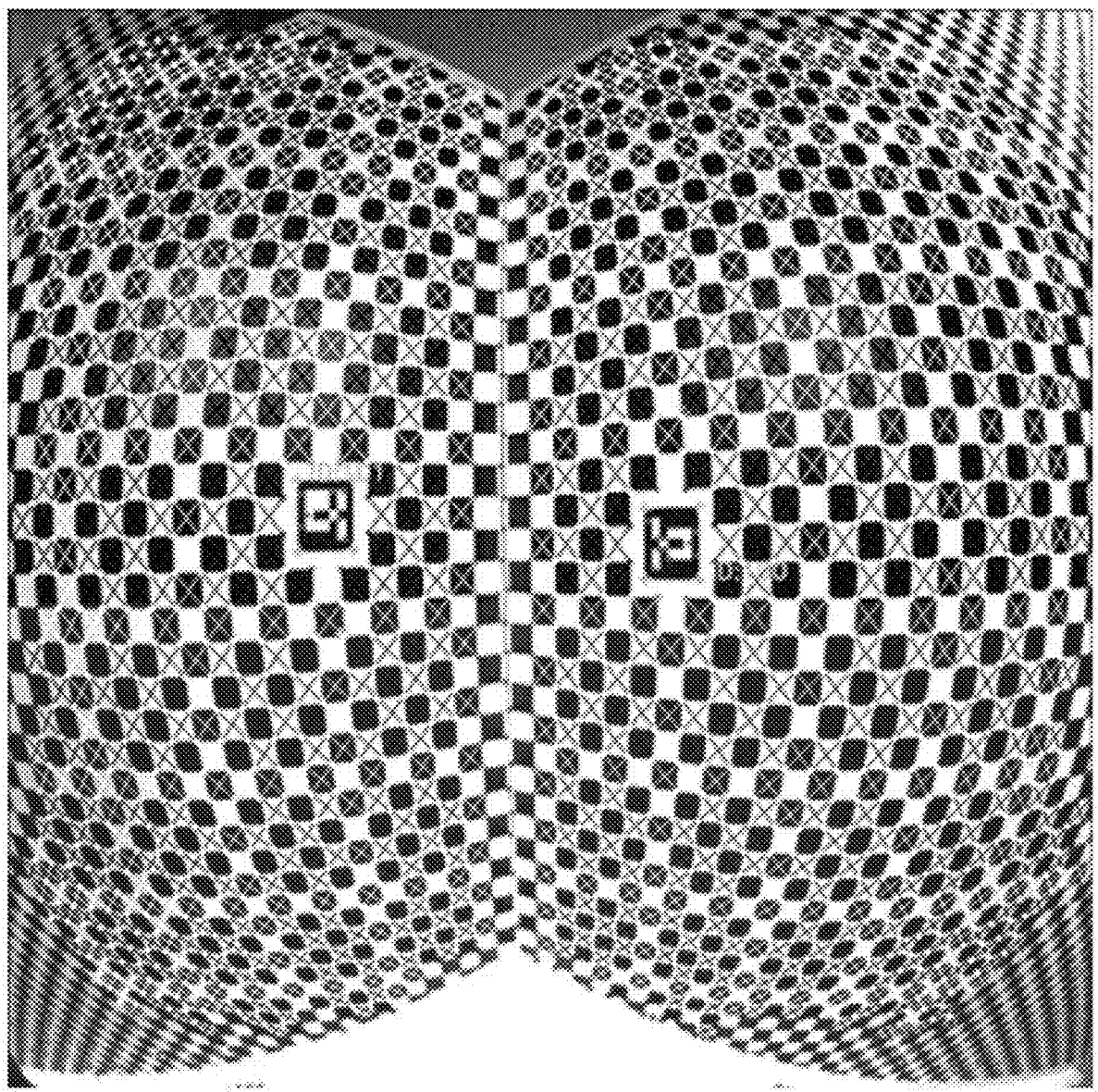
FIG. 19 is a diagram illustrating the result of detection of a feature point and a marker from the captured image depicted in FIG. 18.

FIG. 19 illustrates the result of detection of a feature point and a marker from a captured image depicted in FIG. 18. In this case, as mentioned earlier, the association with an index can be determined accurately and efficiently by searching for a feature point by using a marker image as a reference point in consideration of distortion of a captured image. Eventually, the position coordinates in a captured image of a feature point can easily be associated with the 3D model position coordinates.

Figure 20:
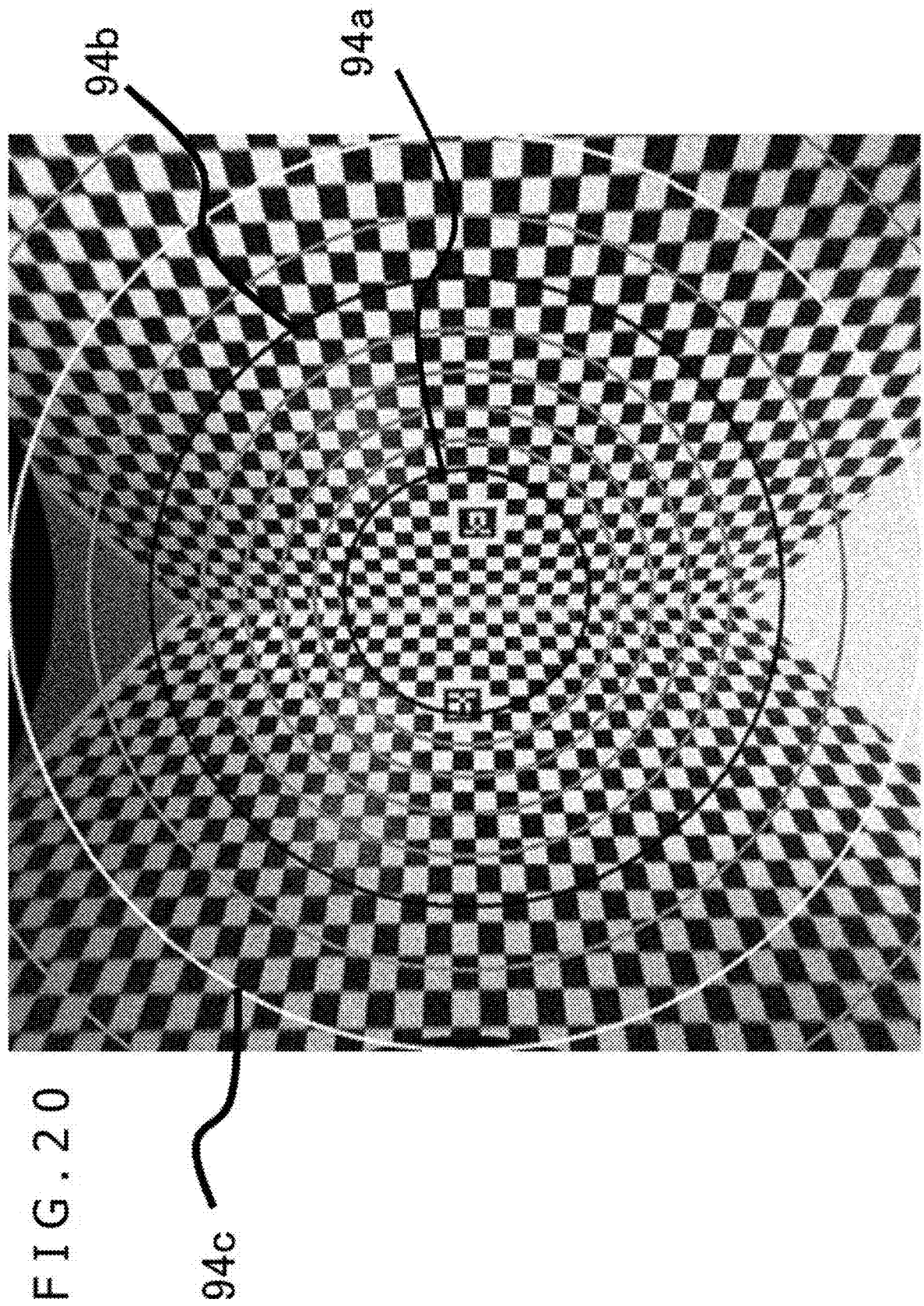
FIG. 20 is a diagram depicting an image that is corrected on the basis of a camera parameter derived from calibration performed by using feature point association information.

FIG. 20 depicts an image that is corrected based on a camera parameter derived from calibration performed by using feature point association information. The depicted image is centered around an optical axis. Further, circles in FIG. 20 indicate ranges corresponding to a plurality of viewing angles. In order from closest to the center to farthest from the center, the ranges are designated 94a, 94b, and 94c. The viewing angles of these ranges are 50 degrees, 100 degrees, and 120 degrees, respectively. It is obvious that the acquired image of the chart 200 is not distorted even at an angle as wide as 120 degrees.

The present embodiment, which has been described above, calibrates an imaging apparatus by using a chart having a plurality of plane surfaces forming a predetermined angle. Therefore, a single capture of an image makes it possible to acquire information that is equivalent to information obtained by capturing an image of one plane surface with the point of view varied. Further, the pattern to be depicted on the chart is configured such that an orthogonal and uniform array of feature points is obtained when the pattern is imaged in a state where the chart is inclined with respect to the imaging plane. Moreover, the chart is disposed in front of the imaging plane and open at such an angle that the chart is in contact with a circumference having a radius equal to the focal length of the imaging apparatus and centered with respect to the optical center of the imaging apparatus.

Consequently, it is possible to obtain a captured image while the distortion of each plane surface of the chart is minimized, and search for feature points easily and with high accuracy. Particularly, feature points viewable in the captured image can be arrayed in the same manner as in the case of a common chart pattern by generating an appropriate chart pattern in accordance with the angle between the imaging plane and the plane surfaces forming the chart. Therefore, the present embodiment can easily be applied to various calibration methods.

For example, the use of the method by Zhang requires significant man-hours because imaging operations need to be performed while varying the position and posture. Meanwhile, the present embodiment makes it possible to use computations according to the method by Zhang without varying the position and posture. Therefore, the present embodiment reduces the required man-hours without degrading the accuracy. As a result, this reduces the cost of mass production of the imaging apparatus.

The present invention has been described in terms of an embodiment. It will be understood by those skilled in the art that the foregoing embodiment is illustrative, and that the combination of the elements and processes of the foregoing embodiment may be variously modified, and further that such modifications are also within the scope of the present invention.

REFERENCE SIGNS LIST

10 Calibration apparatus, 12 Imaging apparatus, 14 Jig, 20 Chart pattern generation apparatus, 22 Inverse transformation parameter generation section, 24 Pattern transformation section, 26 Pattern image storage section, 28 Projective transformation parameter generation section, 30 Projective transformation parameter storage section, 34 Image acquisition section, 36 Feature point information acquisition section, 38 Calibration section, 40 Projective transformation parameter storage section, 42 Feature point information storage section, 44 Camera parameter storage section, 122 CPU, 124 GPU, 126 Main memory, 200 Chart.

INDUSTRIAL APPLICABILITY

As described above, the present invention is applicable, for example, to a calibration apparatus of an imaging apparatus, a jig for calibration, a chart pattern generation apparatus, and a system including the chart pattern generation apparatus.

The invention claimed is:

1. A calibration apparatus comprising:
an image acquisition section acquiring data regarding a captured image of a chart having a plurality of plane surfaces forming a predetermined angle;
a feature point information acquisition section detecting, from the captured image, an image of a feature point of a chart pattern depicted on a surface of the chart, and generating feature point information indicative of association between position coordinates of the image of the feature point and position coordinates of the feature point on the surface of the chart; and
a calibration section performing computation for calibration on a basis of the feature point information, and acquiring a predetermined camera parameter to be output,
wherein the feature point information acquisition section identifies, within the captured image, an image of each of the plane surfaces on a basis of an image of a marker included in the chart pattern, and performing a process of generating the feature point information for each of the plane surfaces, and
wherein the chart pattern is obtained by transforming a predetermined pattern in accordance with a change in distance between an imaging plane and each of the plane surfaces in such a manner as to acquire the predetermined pattern within a captured image.

2. The calibration apparatus according to claim 1, the feature point information acquisition section determines an image distortion in the captured image in accordance with a change from the predetermined pattern, searches for a spot corresponding to the image distortion, and associates an image of a feature point in the captured image with an index indicative of the position of the feature point in the predetermined pattern.

3. The calibration apparatus according to claim 2, wherein the feature point information acquisition section further includes a projective transformation parameter storage section storing a homography matrix, the homography matrix being adapted to transform position coordinates of an index coordinate system defining the index into position coordinates of the feature point on the surface of the chart, and
the feature point information is generated by acquiring the position coordinates of the feature point on the surface of the chart through the use of the homography matrix in accordance with the index associated with the image of the feature point in the captured image.

4. The calibration apparatus according to claim 2, wherein the feature point information acquisition section determines the distortion by acquiring a homography matrix for transforming a rectangle having vertexes regarded as four neighboring feature points of the predetermined pattern into a rectangle having vertexes regarded as images of the feature points in the captured image, and determines a search range for an image of the next feature point in the captured image by applying the homography matrix to another rectangle in the predetermined pattern.

5. The calibration apparatus according to claim 1, wherein the marker varies from one of the plane surfaces to another.

6. The calibration apparatus according to claim 1, wherein the plurality of plane surfaces are structured such that the distance from an imaging plane is maximized at an assumed optical axis of an imaging apparatus.

7. The calibration apparatus according to claim 1, wherein the plurality of plane surfaces include a line-symmetric structure that is formed by connecting two rectangular plane surfaces having the same area.

8. The calibration apparatus according to claim 1, wherein the plurality of plane surfaces have a structure that is formed by connecting the two rectangular plane surfaces to another rectangular plane surface.

9. The calibration apparatus of claim 1, further comprising:
an inverse transformation parameter generation section acquiring setting information regarding positions and postures of the plurality of plane surfaces forming the chart and the imaging plane of the imaging apparatus, and generating a transformation parameter for achieving transformation based on a change in distance between the imaging plane and each of the plane surfaces in such a manner as to obtain the predetermined pattern within a captured image; and a pattern transformation section transforming the predetermined pattern by using the transformation parameter and generating data regarding the chart pattern to be output.

10. The calibration apparatus according to claim 9, further comprising: a projective transformation parameter generation section generating and outputting a homography matrix, the homography matrix being adapted to transform an index indicative of a position of a feature point in the predetermined pattern into position coordinates of a feature point on a surface of the chart, the chart pattern being depicted on the surface of the chart.

11. A calibration method comprising:
   acquiring, from an imaging apparatus, data regarding a captured image of a chart having a plurality of plane surfaces forming a predetermined angle;
   detecting, from the captured image, an image of a feature point of a chart pattern depicted on a surface of the chart and generating feature point information indicative of association between position coordinates of the image of the feature point and position coordinates of the feature point on the surface of the chart; and
   performing computation for calibration on a basis of the feature point information and acquiring a predetermined camera parameter to be output,
   wherein the step of generating the feature point information identifies, within the captured image, an image of each of the plane surfaces on a basis of an image of a marker included in the chart pattern and performing a process of generating the feature point information for each of the plane surfaces, and
   wherein the chart pattern is obtained by transforming a predetermined pattern in accordance with a change in distance between an imaging plane and each of the plane surfaces in such a manner as to acquire the predetermined pattern within a captured image.

12. A non-transitory, computer-readable storage medium containing a computer program, which when executed by a computer, causes the computer to carry out actions, comprising:
   acquiring data regarding a captured image of a chart having a plurality of plane surfaces forming a predetermined angle;
   detecting, from the captured image, an image of a feature point of a chart pattern depicted on a surface of the chart and generating feature point information indicative of association between position coordinates of the image of the feature point and position coordinates of the feature point on the surface of the chart; and
   performing computation for calibration on a basis of the feature point information and acquiring a predetermined camera parameter to be output,
   wherein the generating the feature point information identifies, within the captured image, an image of each of the plane surfaces on a basis of an image of a marker included in the chart pattern and performing a process of generating the feature point information for each of the plane surfaces, and
   wherein the chart pattern is obtained by transforming a predetermined pattern in accordance with a change in distance between an imaging plane and each of the plane surfaces in such a manner as to acquire the predetermined pattern within a captured image.

* * * * *